US009951904B2

(12) United States Patent
Perez et al.

(10) Patent No.: US 9,951,904 B2
(45) Date of Patent: Apr. 24, 2018

(54) ROTATABLE SEAT CLAMPS FOR RAIL CLAMP

(71) Applicant: Stryker Corporation, Kalamazoo, MI (US)

(72) Inventors: Timothy Perez, Plantation, FL (US); John R. Fossez, Frisco, TX (US); Paul Shiels, Albuquerque, NM (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 15/074,384

(22) Filed: Mar. 18, 2016

(65) Prior Publication Data

US 2016/0281920 A1    Sep. 29, 2016

Related U.S. Application Data

(60) Provisional application No. 62/137,618, filed on Mar. 24, 2015.

(51) Int. Cl.
*A61F 5/37* (2006.01)
*F16M 13/02* (2006.01)
*A61G 13/12* (2006.01)
*F16B 2/12* (2006.01)
*F16B 2/10* (2006.01)
*A61G 13/10* (2006.01)

(52) U.S. Cl.
CPC ......... *F16M 13/022* (2013.01); *A61G 13/101* (2013.01); *A61G 13/1245* (2013.01); *F16B 2/10* (2013.01); *F16B 2/12* (2013.01)

(58) Field of Classification Search
CPC .............. F16M 13/022; A61G 13/101; A61G 13/1245; F16B 2/10; F16B 2/12
USPC .......... 248/229.41, 229.51, 229.23; 128/882, 128/846, 869
See application file for complete search history.

(56) References Cited

U.S. PATENT DOCUMENTS

| 1,465,259 A | 8/1923 | Friedman |
| 1,516,795 A | 11/1924 | Schwarting |

(Continued)

FOREIGN PATENT DOCUMENTS

| DE | 202011000308 U1 | 4/2011 |
| EP | 2119400 A1 | 11/2009 |

(Continued)

OTHER PUBLICATIONS

European Search Report for EP Application 16161862.4 dated Sep. 26, 2016.

(Continued)

*Primary Examiner* — Todd M Epps
(74) *Attorney, Agent, or Firm* — Lerner, David, Littenberg, Krumholz & Mentlik, LLP

(57) ABSTRACT

Disclosed herein is a clamp attachable to a support rail of a hospital bed, for example. The clamp includes a body, first and second arms coupled to the body, wherein the first and second arms are moveable towards and away from one another. The clamp further includes at least one seat clamp member pivotably coupled to at least one of the first and second arms. The clamp is attached to the support rail when the at least one seat clamp member contacts the support rail and the first and second arms are in a clamped position.

20 Claims, 10 Drawing Sheets

(56) References Cited

U.S. PATENT DOCUMENTS

| | | |
|---|---|---|
| 2,473,266 A | 6/1949 | Wexler |
| 2,586,488 A | 2/1952 | Smith |
| 2,998,476 A | 8/1961 | Nix |
| 3,070,088 A | 12/1962 | Brahos |
| 3,178,139 A | 4/1965 | McFarlin |
| 3,221,743 A | 12/1965 | Thompson et al. |
| 3,522,799 A | 8/1970 | Gauthier |
| 3,542,015 A | 11/1970 | Steinman |
| 3,544,060 A | 12/1970 | Stoltz et al. |
| 3,632,152 A | 1/1972 | Renfroe |
| 3,762,401 A | 10/1973 | Tupper |
| 3,783,320 A | 1/1974 | Clement |
| 3,823,709 A | 7/1974 | McGuire |
| 3,998,217 A | 12/1976 | Trumbull et al. |
| 4,018,412 A | 4/1977 | Kees, Jr. et al. |
| 4,032,100 A | 6/1977 | Kahn |
| 4,190,224 A | 2/1980 | LeBlanc et al. |
| 4,232,681 A | 11/1980 | Tulaszewski |
| 4,274,398 A | 6/1981 | Scott, Jr. |
| 4,291,909 A | 9/1981 | Coatantiec |
| 4,373,709 A | 2/1983 | Whitt |
| 4,407,277 A | 10/1983 | Ellison |
| 4,426,071 A | 1/1984 | Klevstad |
| 4,428,571 A | 1/1984 | Sugarman |
| 4,430,991 A | 2/1984 | Darnell |
| 4,443,005 A | 4/1984 | Sugarman et al. |
| RE32,021 E | 11/1985 | Scott, Jr. |
| 4,564,164 A | 1/1986 | Allen et al. |
| 4,615,516 A | 10/1986 | Stulberg et al. |
| 4,621,619 A | 11/1986 | Sharpe |
| 4,717,102 A | 1/1988 | Pflieger |
| 4,809,687 A | 3/1989 | Allen |
| 4,813,401 A | 3/1989 | Grieshaber |
| 4,846,431 A | 7/1989 | Pflieger |
| 4,852,840 A | 8/1989 | Marks |
| 4,865,019 A | 9/1989 | Phillips |
| 4,901,963 A | 2/1990 | Yoder |
| 4,901,964 A | 2/1990 | McConnell |
| 4,953,820 A | 9/1990 | Yoder |
| 4,997,154 A | 3/1991 | Little |
| 5,001,739 A | 3/1991 | Fischer |
| 5,007,912 A | 4/1991 | Albrektsson et al. |
| 5,025,802 A | 6/1991 | Laico et al. |
| 5,027,799 A | 7/1991 | Laico et al. |
| 5,056,535 A | 10/1991 | Bonnell |
| 5,224,680 A | 7/1993 | Greenstein et al. |
| 5,231,974 A | 8/1993 | Giglio et al. |
| 5,290,220 A | 3/1994 | Guhl |
| 5,320,314 A | 6/1994 | Bookwalter et al. |
| 5,320,444 A | 6/1994 | Bookwalter et al. |
| 5,326,059 A | 7/1994 | Pryor et al. |
| 5,351,680 A | 10/1994 | Jung |
| 5,369,827 A | 12/1994 | Parke et al. |
| 5,369,851 A | 12/1994 | Merkel |
| 5,385,324 A | 1/1995 | Pryor et al. |
| 5,462,551 A | 10/1995 | Bailey et al. |
| 5,478,041 A | 12/1995 | Mayne |
| 5,498,098 A | 3/1996 | Cairns |
| 5,514,143 A | 5/1996 | Bonutti et al. |
| 5,520,610 A | 5/1996 | Giglio et al. |
| 5,535,973 A | 7/1996 | Bailey et al. |
| 5,553,963 A | 9/1996 | Hoy et al. |
| 5,560,577 A | 10/1996 | Keselman |
| 5,581,900 A | 12/1996 | Payne |
| 5,582,379 A | 12/1996 | Keselman et al. |
| 5,645,079 A | 7/1997 | Zahiri et al. |
| 5,664,904 A | 9/1997 | Hapgood et al. |
| 5,701,991 A | 12/1997 | Helmetsie |
| 5,741,210 A | 4/1998 | Dobrovolny |
| 5,769,783 A | 6/1998 | Fowler |
| 5,775,334 A | 7/1998 | Lamb et al. |
| 5,785,649 A | 7/1998 | Fowler, Jr. |
| 5,799,349 A | 9/1998 | Petersen |
| 5,800,346 A | 9/1998 | Adams |
| 5,802,641 A | 9/1998 | Van Steenburg |
| 5,810,721 A | 9/1998 | Mueller et al. |
| 5,833,189 A | 11/1998 | Rossman et al. |
| 5,836,559 A | 11/1998 | Ronci |
| 5,846,192 A | 12/1998 | Teixido |
| 5,853,156 A | 12/1998 | Moore et al. |
| 5,876,333 A | 3/1999 | Bigliani et al. |
| 5,899,853 A | 5/1999 | Fowler, Jr. |
| 5,918,330 A | 7/1999 | Navarro et al. |
| 5,938,592 A | 8/1999 | Koteles et al. |
| 5,951,467 A | 9/1999 | Picha et al. |
| 5,961,085 A | 10/1999 | Navarro et al. |
| 5,964,697 A | 10/1999 | Fowler, Jr. |
| 5,964,698 A | 10/1999 | Fowler |
| 5,964,699 A | 10/1999 | Rullo et al. |
| 5,976,080 A | 11/1999 | Farascioni |
| 5,984,866 A | 11/1999 | Rullo et al. |
| 6,015,128 A | 1/2000 | Lombardi |
| 6,017,306 A | 1/2000 | Bigliani et al. |
| 6,030,340 A | 2/2000 | Maffei et al. |
| 6,048,309 A | 4/2000 | Flom et al. |
| 6,058,534 A | 5/2000 | Navarro et al. |
| 6,077,221 A | 6/2000 | Fowler, Jr. |
| 6,090,042 A | 7/2000 | Rullo et al. |
| 6,090,043 A | 7/2000 | Austin et al. |
| 6,099,468 A | 8/2000 | Santilli et al. |
| 6,102,853 A | 8/2000 | Scirica et al. |
| 6,190,312 B1 | 2/2001 | Fowler, Jr. |
| 6,200,263 B1 | 3/2001 | Person |
| 6,213,940 B1 | 4/2001 | Sherts et al. |
| 6,228,026 B1 | 5/2001 | Rullo et al. |
| 6,234,173 B1 | 5/2001 | Hajianpour |
| 6,263,531 B1 | 7/2001 | Navarro et al. |
| 6,264,605 B1 | 7/2001 | Scirica et al. |
| 6,302,843 B1 | 10/2001 | Lees et al. |
| 6,315,718 B1 | 11/2001 | Sharratt |
| 6,340,345 B1 | 1/2002 | Lees et al. |
| 6,368,271 B1 | 4/2002 | Sharratt |
| 6,370,741 B1 | 4/2002 | Lu |
| 6,387,047 B1 | 5/2002 | Duhaylongsod et al. |
| 6,464,634 B1 | 10/2002 | Fraser |
| 6,468,207 B1 | 10/2002 | Fowler, Jr. |
| 6,471,171 B1 | 10/2002 | VanderVelde |
| 6,488,621 B1 | 12/2002 | Rullo et al. |
| 6,511,423 B2 | 1/2003 | Farley |
| 6,530,883 B2 | 3/2003 | Bookwalter et al. |
| 6,537,212 B2 | 3/2003 | Sherts et al. |
| 6,547,311 B1 | 4/2003 | Derecktor |
| 6,568,644 B2 | 5/2003 | Pedersen |
| 6,572,541 B1 | 6/2003 | Petersvik |
| 6,585,206 B2 | 7/2003 | Metz et al. |
| 6,598,275 B1 | 7/2003 | Kolody et al. |
| 6,610,009 B2 | 8/2003 | Person |
| 6,616,604 B1 | 9/2003 | Bass et al. |
| 6,616,605 B2 | 9/2003 | Wright et al. |
| 6,622,980 B2 | 9/2003 | Boucher et al. |
| 6,659,944 B2 | 12/2003 | Sharratt |
| 6,659,945 B2 | 12/2003 | Ball et al. |
| 6,663,055 B2 | 12/2003 | Boucher et al. |
| 6,704,959 B2 | 3/2004 | Schuerch |
| 6,733,445 B2 | 5/2004 | Sherts et al. |
| 6,736,775 B2 | 5/2004 | Phillips |
| 6,793,186 B2 | 9/2004 | Pedersen |
| 6,814,700 B1 | 11/2004 | Mueller et al. |
| 6,824,511 B1 | 11/2004 | Bell et al. |
| 6,826,794 B2 | 12/2004 | Mahoney et al. |
| 6,874,184 B2 | 4/2005 | Chandler |
| 6,875,172 B2 | 4/2005 | Krebs |
| 6,896,232 B2 | 5/2005 | Crowell et al. |
| 6,932,765 B2 | 8/2005 | Berg |
| 6,966,086 B2 | 11/2005 | Metz et al. |
| 7,003,827 B2 | 2/2006 | DeMayo |
| 7,022,069 B2 | 4/2006 | Masson et al. |
| 7,077,805 B1 | 7/2006 | Masson et al. |
| 7,097,616 B2 | 8/2006 | Bjork et al. |
| 7,125,380 B2 | 10/2006 | Yager |
| 7,137,949 B2 | 11/2006 | Scirica et al. |
| 7,156,806 B2 | 1/2007 | Dobrovolny |
| 7,159,832 B2 | 1/2007 | Easterling |
| 7,195,593 B1 | 3/2007 | Masson et al. |

(56) References Cited

U.S. PATENT DOCUMENTS

| | | |
|---|---|---|
| 7,243,654 B2 | 7/2007 | Schuerch |
| 7,246,390 B2 | 7/2007 | Mitsuishi et al. |
| 7,264,589 B2 | 9/2007 | Sharratt |
| 7,294,104 B2 | 11/2007 | Person |
| 7,309,312 B2 | 12/2007 | Bjork et al. |
| 7,316,040 B2 | 1/2008 | Siccardi et al. |
| 7,337,483 B2 | 3/2008 | Boucher et al. |
| 7,380,299 B1 | 6/2008 | DeMayo |
| 7,386,922 B1 | 6/2008 | Taylor et al. |
| 7,435,219 B2 | 10/2008 | Kim |
| 7,458,933 B2 | 12/2008 | LeVahn et al. |
| 7,520,007 B2 * | 4/2009 | Skripps .......... A61G 13/04 24/459 |
| 7,566,038 B2 | 7/2009 | Scott et al. |
| 7,624,958 B2 | 12/2009 | Ropertz et al. |
| 7,665,167 B2 | 2/2010 | Branch et al. |
| 7,686,267 B2 | 3/2010 | DaSilva |
| 7,691,058 B2 | 4/2010 | Rioux et al. |
| 7,725,162 B2 | 5/2010 | Malackowski et al. |
| 7,731,141 B2 | 6/2010 | Schuerch |
| 7,740,016 B1 | 6/2010 | Pigg |
| 7,744,530 B2 | 6/2010 | Person |
| RE41,412 E | 7/2010 | Van Steenburg |
| 7,753,844 B2 | 7/2010 | Sharratt et al. |
| 7,758,500 B2 | 7/2010 | Boyd et al. |
| 7,775,974 B2 | 8/2010 | Buckner et al. |
| 7,789,352 B2 | 9/2010 | Darling, III |
| 7,811,230 B2 | 10/2010 | Hsueh et al. |
| 7,827,992 B2 | 11/2010 | Sieber |
| 7,832,035 B2 | 11/2010 | Walczyk |
| 7,832,401 B2 | 11/2010 | Torrie et al. |
| 7,909,761 B2 | 3/2011 | Banchieri et al. |
| 7,931,591 B2 | 4/2011 | McCarthy et al. |
| 7,947,006 B2 | 5/2011 | Torrie et al. |
| 7,947,862 B2 | 5/2011 | Livorsi |
| 7,951,097 B2 | 5/2011 | Schaeffer |
| 7,955,257 B2 | 6/2011 | Frasier et al. |
| 7,985,227 B2 | 7/2011 | Branch et al. |
| 8,001,633 B2 | 8/2011 | Swain, Jr. |
| 8,011,629 B2 | 9/2011 | Herskovic |
| 8,020,559 B2 | 9/2011 | Lacriox |
| 8,038,106 B2 | 10/2011 | Magno, Jr. et al. |
| 8,038,611 B2 | 10/2011 | Raymond et al. |
| 8,051,515 B1 | 11/2011 | Kring |
| 8,066,239 B2 | 11/2011 | Molnar et al. |
| 8,070,119 B2 | 12/2011 | Taylor |
| 8,085,481 B2 | 12/2011 | Hill |
| 8,099,808 B1 | 1/2012 | McKeon |
| 8,100,827 B2 | 1/2012 | Farley |
| 8,114,018 B2 | 2/2012 | Park et al. |
| 8,117,695 B2 | 2/2012 | Paz et al. |
| 8,132,278 B1 | 3/2012 | Bailey |
| 8,141,839 B2 | 3/2012 | Buchner |
| 8,146,599 B2 | 4/2012 | Wilson et al. |
| 8,146,963 B2 | 4/2012 | Wyslucha |
| 8,167,259 B2 | 5/2012 | Spang, Jr. et al. |
| 8,182,469 B2 | 5/2012 | Anderson et al. |
| 8,226,590 B2 | 7/2012 | Tucker et al. |
| 8,230,864 B2 | 7/2012 | Hunter, Jr. |
| 8,231,528 B1 | 7/2012 | Friedrich et al. |
| 8,231,529 B2 | 7/2012 | Kanekasu et al. |
| 8,239,988 B2 | 8/2012 | Brenner |
| 8,246,028 B2 | 8/2012 | Larkin et al. |
| 8,262,567 B2 | 9/2012 | Sharp et al. |
| 8,286,283 B2 | 10/2012 | Copeland et al. |
| 8,302,228 B2 | 11/2012 | Aboujaoude |
| 8,302,921 B2 | 11/2012 | Schuerch |
| 8,317,710 B2 | 11/2012 | Nakamura et al. |
| 8,322,342 B2 | 12/2012 | Soto et al. |
| 8,332,977 B2 | 12/2012 | Bochner et al. |
| 8,356,601 B2 | 1/2013 | Hunter, Jr. |
| 8,388,528 B2 | 3/2013 | Rioux et al. |
| 8,393,588 B2 | 3/2013 | Blum et al. |
| 8,413,660 B2 | 4/2013 | Weinstein et al. |
| 8,448,274 B2 | 5/2013 | Broens |
| 8,459,602 B2 | 6/2013 | Herskovic |
| 8,469,033 B2 | 6/2013 | Gardner et al. |
| 8,469,911 B2 | 6/2013 | Hiebert |
| 8,474,076 B2 | 7/2013 | Hornbach |
| 8,485,484 B2 | 7/2013 | Kronner et al. |
| 8,485,952 B2 | 7/2013 | Gehrke |
| 8,523,769 B2 | 9/2013 | Fehling et al. |
| 8,523,770 B2 | 9/2013 | McLoughlin |
| 8,544,127 B2 | 10/2013 | Hsieh |
| 8,561,234 B1 | 10/2013 | Kring |
| 8,566,984 B2 | 10/2013 | Paz et al. |
| 8,579,244 B2 | 11/2013 | Bally |
| 8,617,064 B2 | 12/2013 | Farley |
| 8,621,692 B1 | 1/2014 | Kring |
| 8,636,680 B2 | 1/2014 | Hiebert |
| 8,636,744 B2 | 1/2014 | Tochigi et al. |
| 8,657,767 B2 | 2/2014 | Chan |
| 8,690,807 B2 | 4/2014 | Hiebert |
| 8,695,135 B2 | 4/2014 | Berube |
| 8,695,137 B1 | 4/2014 | Hanson |
| 8,696,558 B2 | 4/2014 | Parker et al. |
| 8,696,559 B2 | 4/2014 | Miles et al. |
| 8,696,560 B2 | 4/2014 | Strauss et al. |
| 8,696,562 B2 | 4/2014 | Mulac et al. |
| 8,696,607 B2 | 4/2014 | McDonnell et al. |
| 8,701,674 B2 | 4/2014 | Tweardy et al. |
| 8,702,054 B2 | 4/2014 | Lindner et al. |
| 8,702,600 B2 | 4/2014 | Perrow |
| 8,706,189 B2 | 4/2014 | Hagen et al. |
| 8,707,486 B2 | 4/2014 | Chella et al. |
| 8,707,487 B2 | 4/2014 | Kullman |
| 8,713,728 B2 | 5/2014 | Heimbrock et al. |
| 8,713,733 B2 | 5/2014 | Caforio |
| 8,714,502 B1 | 5/2014 | Davis |
| 8,714,503 B1 | 5/2014 | Fadrow |
| 8,714,567 B2 | 5/2014 | Fievet |
| 8,715,174 B2 | 5/2014 | Kaul |
| 8,719,983 B2 | 5/2014 | Nash |
| 8,720,447 B2 | 5/2014 | North |
| 8,720,724 B1 | 5/2014 | Lynn, IV |
| 8,721,537 B2 | 5/2014 | Albrecht et al. |
| 8,721,538 B2 | 5/2014 | Bucholz |
| 8,721,539 B2 | 5/2014 | Shohat et al. |
| 8,721,577 B1 | 5/2014 | Perry |
| 8,724,884 B2 | 5/2014 | Lomas et al. |
| 8,726,435 B2 | 5/2014 | Briody |
| 8,727,291 B2 | 5/2014 | Scoggins et al. |
| 8,727,972 B2 | 5/2014 | Zhang et al. |
| 8,727,973 B2 | 5/2014 | Okoniewski |
| 8,727,975 B1 | 5/2014 | Pfabe et al. |
| 8,728,019 B2 | 5/2014 | Kruijsen et al. |
| 8,732,875 B2 | 5/2014 | O'Keefe |
| 8,733,027 B1 | 5/2014 | Marston et al. |
| 8,733,362 B2 | 5/2014 | Krook et al. |
| 8,733,365 B2 | 5/2014 | Krenzel |
| 8,734,338 B2 | 5/2014 | Gorek et al. |
| 8,734,371 B2 | 5/2014 | Robertson |
| 8,739,335 B1 | 6/2014 | Hoggatt |
| 8,739,337 B1 | 6/2014 | Sanders et al. |
| 8,740,162 B1 | 6/2014 | Morgan |
| 8,740,786 B2 | 6/2014 | Blain et al. |
| 8,740,787 B2 | 6/2014 | Santilli |
| 8,745,787 B1 | 6/2014 | Heimlich |
| 8,746,497 B2 | 6/2014 | Bourbeau et al. |
| 8,747,302 B2 | 6/2014 | Piskun |
| 8,747,307 B2 | 6/2014 | Miles et al. |
| 8,747,309 B2 | 6/2014 | Viola |
| 8,753,266 B2 | 6/2014 | Spence et al. |
| 8,753,269 B2 | 6/2014 | Tabor |
| 8,753,270 B2 | 6/2014 | Miles et al. |
| 8,753,272 B2 | 6/2014 | Farley |
| 8,753,298 B2 | 6/2014 | Sebelius et al. |
| 8,753,358 B2 | 6/2014 | Cook |
| 8,756,735 B2 | 6/2014 | Heimbrock et al. |
| 8,757,573 B1 | 6/2014 | Barnes, Jr. |
| 8,758,235 B2 | 6/2014 | Jaworek |
| 8,758,236 B2 | 6/2014 | Albrecht et al. |
| 8,763,177 B2 | 7/2014 | Shah et al. |
| 8,764,649 B2 | 7/2014 | Miles et al. |

(56) References Cited

U.S. PATENT DOCUMENTS

| | | |
|---|---|---|
| 8,764,692 B2 | 7/2014 | Ferrigolo et al. |
| 8,769,781 B2 | 7/2014 | Carney |
| 8,770,200 B2 | 7/2014 | Ahluwalia |
| 8,771,179 B2 | 7/2014 | Lozman et al. |
| 8,771,210 B2 | 7/2014 | Smith et al. |
| 8,771,213 B2 | 7/2014 | Wens |
| 8,776,294 B1 | 7/2014 | McCarty et al. |
| 8,776,798 B2 | 7/2014 | Choi et al. |
| 8,777,169 B2 | 7/2014 | Raye et al. |
| 8,777,171 B2 | 7/2014 | Gainey, Jr. et al. |
| 8,777,849 B2 | 7/2014 | Haig et al. |
| 8,777,882 B2 | 7/2014 | Ho |
| 8,782,832 B2 | 7/2014 | Blyakher et al. |
| 8,783,264 B2 | 7/2014 | Levendowski et al. |
| 8,783,416 B2 | 7/2014 | Singleton et al. |
| 8,783,636 B2 | 7/2014 | Okita |
| 8,784,305 B2 | 7/2014 | DeSantis et al. |
| 8,784,306 B2 | 7/2014 | Roth et al. |
| 8,789,533 B2 | 7/2014 | Steffens et al. |
| 8,790,245 B2 | 7/2014 | Rodriguez Fernandez et al. |
| 8,794,241 B2 | 8/2014 | Dal Monte |
| 8,795,163 B2 | 8/2014 | Widenhouse et al. |
| 8,795,164 B2 | 8/2014 | Stopek |
| 8,795,213 B2 | 8/2014 | Mills |
| 8,795,289 B2 | 8/2014 | Fowler et al. |
| 8,795,326 B2 | 8/2014 | Richard |
| 8,800,569 B2 | 8/2014 | Whitmore, III et al. |
| 8,800,921 B2 | 8/2014 | Gensch et al. |
| 8,800,941 B2 | 8/2014 | Kahn |
| 8,801,349 B2 | 8/2014 | McPheeters |
| 8,801,608 B2 | 8/2014 | Hardenbrook |
| 8,801,730 B2 | 8/2014 | Jacob |
| 8,804,321 B2 | 8/2014 | Kincaid et al. |
| 8,806,683 B2 | 8/2014 | Gauta |
| 8,807,353 B2 | 8/2014 | Barkdoll et al. |
| 8,808,172 B2 | 8/2014 | Manzanares |
| 8,808,173 B2 | 8/2014 | Okazaki et al. |
| 8,808,174 B2 | 8/2014 | Kleyman |
| 8,808,175 B2 | 8/2014 | Deitch et al. |
| 8,808,176 B2 | 8/2014 | Menendez et al. |
| 8,808,212 B1 | 8/2014 | Redmond |
| 8,808,215 B2 | 8/2014 | Gaylord |
| 8,814,107 B2 | 8/2014 | Hampe et al. |
| 8,814,118 B2 | 8/2014 | Okita et al. |
| 8,814,213 B2 | 8/2014 | Aosima et al. |
| 8,814,788 B2 | 8/2014 | Gan |
| 8,820,548 B2 | 9/2014 | Wilson |
| 8,820,686 B2 | 9/2014 | Hickle et al. |
| 8,820,690 B2 | 9/2014 | Weber |
| 8,821,044 B1 | 9/2014 | Dordick |
| 8,821,390 B2 | 9/2014 | Kleyman |
| 8,821,393 B2 | 9/2014 | Taylor et al. |
| 8,821,394 B2 | 9/2014 | Hawkins et al. |
| 8,821,423 B2 | 9/2014 | Conlon et al. |
| 8,826,704 B1 | 9/2014 | Marshall |
| 8,827,037 B2 | 9/2014 | Chilton |
| 8,827,216 B2 | 9/2014 | Brown et al. |
| 8,827,223 B2 | 9/2014 | Miller |
| 8,827,902 B2 | 9/2014 | Dietze, Jr. et al. |
| 8,827,903 B2 | 9/2014 | Shelton, IV et al. |
| 8,830,070 B2 | 9/2014 | Dixon et al. |
| 8,832,878 B2 | 9/2014 | McGann |
| 8,833,118 B1 | 9/2014 | McLane |
| 8,833,707 B2 | 9/2014 | Steinberg et al. |
| 8,834,361 B2 | 9/2014 | Hashiba et al. |
| 8,834,362 B2 | 9/2014 | Shipp |
| 8,834,394 B2 | 9/2014 | Ghajar |
| 8,834,396 B2 | 9/2014 | Gainey |
| 8,839,501 B2 | 9/2014 | McClain et al. |
| 8,839,794 B2 | 9/2014 | Tonks et al. |
| 8,839,797 B1 | 9/2014 | DeMayo |
| 8,840,075 B2 | 9/2014 | Dalebout et al. |
| 8,840,076 B2 | 9/2014 | Zuber et al. |
| 8,840,547 B2 | 9/2014 | Rivera et al. |
| 8,844,074 B2 | 9/2014 | Mohr et al. |
| 8,844,210 B2 | 9/2014 | Henriott |
| 8,844,536 B1 | 9/2014 | Schuele |
| 8,844,885 B1 | 9/2014 | Reece-Sullivan |
| 8,845,517 B2 | 9/2014 | Russo |
| 8,845,520 B2 | 9/2014 | Belfiore et al. |
| 8,845,527 B2 | 9/2014 | Crenshaw et al. |
| 8,845,528 B2 | 9/2014 | Kleyman |
| 8,845,568 B2 | 9/2014 | Clark et al. |
| 8,847,756 B2 | 9/2014 | Tallent et al. |
| 8,848,378 B2 | 9/2014 | Liao |
| 8,850,648 B2 | 10/2014 | D'Andrea |
| 8,851,196 B2 | 10/2014 | Silcox et al. |
| 8,852,089 B2 | 10/2014 | Blackwell et al. |
| 8,852,090 B2 | 10/2014 | Friedrich et al. |
| 8,852,253 B2 | 10/2014 | Mali |
| 8,856,985 B2 | 10/2014 | Rensink et al. |
| 8,856,988 B2 | 10/2014 | Frazier |
| 8,857,441 B2 | 10/2014 | Matsuo et al. |
| 8,857,771 B2 | 10/2014 | Streetman |
| 8,857,775 B1 | 10/2014 | Clearman et al. |
| 8,858,193 B2 | 10/2014 | Wu |
| 8,858,482 B2 | 10/2014 | Ingimundarson et al. |
| 8,858,538 B2 | 10/2014 | Belson et al. |
| 8,863,333 B2 | 10/2014 | Cain et al. |
| 8,863,334 B2 | 10/2014 | Gibbons et al. |
| 8,864,091 B1 | 10/2014 | Patriarco |
| 8,864,104 B2 | 10/2014 | Koch et al. |
| 8,864,658 B2 | 10/2014 | Wilkins et al. |
| 8,864,659 B2 | 10/2014 | Davis |
| 8,864,661 B2 | 10/2014 | Olsen |
| 8,864,662 B2 | 10/2014 | Grey et al. |
| 8,864,697 B1 | 10/2014 | Baker et al. |
| 8,866,610 B2 | 10/2014 | Riley et al. |
| 8,869,355 B2 | 10/2014 | Huang |
| 8,869,801 B1 | 10/2014 | Thompson |
| 8,870,044 B1 | 10/2014 | Freese et al. |
| 8,870,136 B2 | 10/2014 | Ellingboe et al. |
| 8,870,727 B2 | 10/2014 | Palmer |
| 8,870,759 B2 | 10/2014 | Viola et al. |
| 8,870,760 B2 | 10/2014 | Heiges et al. |
| 8,870,799 B2 | 10/2014 | Reiley |
| 8,870,802 B1 | 10/2014 | Anderson et al. |
| 8,870,803 B2 | 10/2014 | Reiley et al. |
| 8,870,900 B2 | 10/2014 | Julian et al. |
| 8,875,327 B2 | 11/2014 | Gilley et al. |
| 8,875,329 B2 | 11/2014 | Gomez |
| 8,875,743 B2 | 11/2014 | Persaud et al. |
| 8,876,710 B2 | 11/2014 | Ferreira |
| 8,876,712 B2 | 11/2014 | Yee et al. |
| 8,879,361 B2 | 11/2014 | McGee |
| 8,881,732 B2 | 11/2014 | Blurton et al. |
| 8,882,056 B2 | 11/2014 | Greenfield |
| 8,882,066 B2 | 11/2014 | Otten et al. |
| 8,882,661 B2 | 11/2014 | Hutton et al. |
| 8,882,662 B2 | 11/2014 | Charles |
| 8,882,688 B1 | 11/2014 | Ancinec |
| 8,882,690 B2 | 11/2014 | Toenges |
| 8,887,329 B2 | 11/2014 | Soltani |
| 8,887,336 B2 | 11/2014 | Pezzani et al. |
| 8,887,732 B2 | 11/2014 | Choi et al. |
| 8,888,694 B2 | 11/2014 | Calvosa et al. |
| 8,888,695 B2 | 11/2014 | Piskun et al. |
| 8,893,333 B2 | 11/2014 | Soto et al. |
| 8,893,335 B1 | 11/2014 | Hijuelos |
| 8,894,028 B2 | 11/2014 | Golden et al. |
| 8,894,029 B2 | 11/2014 | Agbodoe et al. |
| 8,894,571 B2 | 11/2014 | Albrecht et al. |
| 8,894,572 B2 | 11/2014 | Bastia et al. |
| 8,894,574 B2 | 11/2014 | Ellman |
| 8,894,575 B2 | 11/2014 | Stopek |
| 8,894,598 B2 | 11/2014 | Ponsi et al. |
| 8,894,659 B2 | 11/2014 | Stauber |
| 8,896,993 B2 | 11/2014 | Belesiu et al. |
| 8,898,836 B1 | 12/2014 | Puri et al. |
| 8,899,539 B2 | 12/2014 | Oliver et al. |
| 8,900,137 B1 | 12/2014 | Lovell et al. |
| 8,905,035 B2 | 12/2014 | Wilson et al. |
| 8,905,451 B1 | 12/2014 | Golz |
| 8,905,923 B2 | 12/2014 | Carlson |

(56) References Cited

U.S. PATENT DOCUMENTS

| | | |
|---|---|---|
| 8,905,950 B2 | 12/2014 | Bonutti et al. |
| 8,910,333 B2 | 12/2014 | Wu |
| 8,910,636 B2 | 12/2014 | Kakko |
| 8,911,364 B2 | 12/2014 | Feigenwinter et al. |
| 8,914,925 B2 | 12/2014 | Angott |
| 8,915,478 B2 | 12/2014 | Perez |
| 8,915,845 B2 | 12/2014 | Pell et al. |
| 8,915,846 B2 | 12/2014 | Miles et al. |
| 8,915,847 B1 | 12/2014 | Wang |
| 8,915,848 B1 | 12/2014 | Rixen |
| 8,915,947 B2 | 12/2014 | Robinson |
| 8,918,931 B1 | 12/2014 | Baker et al. |
| 8,919,346 B2 | 12/2014 | Carlin |
| 8,919,709 B2 | 12/2014 | Zhou et al. |
| 8,919,714 B2 | 12/2014 | Rizk et al. |
| 8,920,314 B2 | 12/2014 | Kleyman et al. |
| 8,920,315 B2 | 12/2014 | Schulte |
| 8,920,354 B2 | 12/2014 | Liberson |
| 8,920,467 B2 | 12/2014 | Taguchi et al. |
| 8,925,179 B2 | 1/2015 | Kirsch et al. |
| 8,925,263 B2 | 1/2015 | Haddock et al. |
| 8,926,505 B2 | 1/2015 | Wenchell |
| 8,931,747 B2 | 1/2015 | Davis |
| 8,931,973 B2 | 1/2015 | Olszewski |
| 8,932,210 B2 | 1/2015 | Woods |
| 8,932,213 B2 | 1/2015 | Okoniewski |
| 8,932,214 B2 | 1/2015 | Hart et al. |
| 8,932,215 B2 | 1/2015 | Friedrich et al. |
| 8,932,242 B2 | 1/2015 | Rohde et al. |
| 9,022,334 B1 † | 5/2015 | DeMayo |
| 9,615,987 B2 * | 4/2017 | Worm ................ A61G 13/1245 |
| 2002/0128577 A1 | 9/2002 | Smart |
| 2003/0080267 A1 | 5/2003 | Eslick |
| 2003/0083553 A1 | 5/2003 | Berg |
| 2003/0154550 A1 | 8/2003 | Murphy et al. |
| 2004/0059194 A1 | 3/2004 | Berg et al. |
| 2004/0186356 A1 | 9/2004 | O'Malley et al. |
| 2004/0242969 A1 | 12/2004 | Sherts et al. |
| 2005/0119531 A1 | 6/2005 | Sharratt |
| 2005/0119697 A1 | 6/2005 | Sharratt |
| 2005/0171405 A1 | 8/2005 | Rowland et al. |
| 2005/0215865 A1 | 9/2005 | LeVahn et al. |
| 2005/0278851 A1 | 12/2005 | DeMayo |
| 2006/0038098 A1 | 2/2006 | Metz et al. |
| 2006/0135852 A1 | 6/2006 | Koros et al. |
| 2007/0251011 A1 | 11/2007 | Matta et al. |
| 2009/0012370 A1 | 1/2009 | Gutierrez et al. |
| 2009/0235457 A1 | 9/2009 | Harvey |
| 2009/0264709 A1 | 10/2009 | Blurton et al. |
| 2009/0264710 A1 | 10/2009 | Chana et al. |
| 2009/0287060 A1 | 11/2009 | Pell et al. |
| 2009/0306466 A1 | 12/2009 | Bonadio et al. |
| 2010/0071704 A1 | 3/2010 | Domondon |
| 2010/0081880 A1 | 4/2010 | Widenhouse et al. |
| 2010/0108841 A1 | 5/2010 | Kronner et al. |
| 2010/0133400 A1 | 6/2010 | Scott et al. |
| 2010/0145155 A1 | 6/2010 | Sorajja |
| 2010/0163055 A1 | 7/2010 | Wilkinson |
| 2010/0185060 A1 | 7/2010 | Farley |
| 2010/0192961 A1 | 8/2010 | Amiot et al. |
| 2010/0230567 A1 | 9/2010 | Schuerch |
| 2010/0242181 A1 | 9/2010 | Bochner et al. |
| 2010/0252702 A1 | 10/2010 | Spang, Jr. et al. |
| 2010/0286481 A1 | 11/2010 | Sharp et al. |
| 2010/0292540 A1 | 11/2010 | Hess et al. |
| 2010/0317927 A1 | 12/2010 | Rumsey |
| 2011/0009706 A1 | 1/2011 | Abdelgany et al. |
| 2011/0023893 A1 | 2/2011 | Striggow et al. |
| 2011/0030698 A1 | 2/2011 | Kaufman et al. |
| 2011/0054259 A1 | 3/2011 | Gorek et al. |
| 2011/0112455 A1 | 5/2011 | Rocklin |
| 2011/0137130 A1 | 6/2011 | Thalgott et al. |
| 2011/0201897 A1 | 8/2011 | Bertagnoli et al. |
| 2011/0213207 A1 | 9/2011 | Frasier et al. |
| 2011/0295075 A1 | 12/2011 | Picha et al. |
| 2012/0085353 A1 | 4/2012 | Siston et al. |
| 2012/0136215 A1 | 5/2012 | Farley |
| 2012/0157788 A1 | 6/2012 | Serowski et al. |
| 2012/0204885 A1 | 8/2012 | Koch |
| 2012/0216348 A1 | 8/2012 | Cox |
| 2012/0232350 A1 | 9/2012 | Seex |
| 2012/0232353 A1 | 9/2012 | McLoughlin |
| 2012/0233782 A1 | 9/2012 | Kreuzer et al. |
| 2012/0238828 A1 | 9/2012 | Fricke |
| 2012/0240938 A1 | 9/2012 | Pamichev |
| 2012/0241571 A1 | 9/2012 | Masionis et al. |
| 2012/0259261 A1 | 10/2012 | Clark et al. |
| 2012/0316400 A1 | 12/2012 | Vijayanagar |
| 2012/0318278 A1 | 12/2012 | Aboujaoude et al. |
| 2012/0324650 A1 | 12/2012 | Russell |
| 2013/0019883 A1* | 1/2013 | Worm ................ A61G 13/101 128/882 |
| 2013/0030254 A1 | 1/2013 | Thalgott et al. |
| 2013/0032156 A1 | 2/2013 | Kring |
| 2013/0087154 A1 | 4/2013 | Hoffman et al. |
| 2013/0137934 A1 | 5/2013 | Slaga et al. |
| 2013/0191994 A1 | 8/2013 | Bellows et al. |
| 2013/0191995 A1 | 8/2013 | Bellows et al. |
| 2013/0192608 A1 | 8/2013 | Hiebert |
| 2013/0192609 A1 | 8/2013 | Bellows et al. |
| 2013/0204091 A1 | 8/2013 | Menendez et al. |
| 2013/0206148 A1 | 8/2013 | Hiebert |
| 2013/0206149 A1 | 8/2013 | Spendley |
| 2013/0219625 A1 | 8/2013 | Hsieh |
| 2013/0245383 A1 | 9/2013 | Friedrich et al. |
| 2013/0245384 A1 | 9/2013 | Friedrich et al. |
| 2013/0247919 A1 | 9/2013 | Chauvette et al. |
| 2013/0263863 A1 | 10/2013 | Baker et al. |
| 2013/0269109 A1 | 10/2013 | Yu |
| 2013/0303859 A1 | 11/2013 | Nowak et al. |
| 2013/0318721 A1 | 12/2013 | Gauta |
| 2013/0326818 A1 | 12/2013 | Wood et al. |
| 2014/0005485 A1 | 1/2014 | Tesar et al. |
| 2014/0007408 A1 | 1/2014 | Nool |
| 2014/0039267 A1 | 2/2014 | Seex et al. |
| 2014/0058210 A1 | 2/2014 | Raymond et al. |
| 2014/0059773 A1 | 3/2014 | Carn |
| 2014/0096777 A1 | 4/2014 | Derner |
| 2014/0096779 A1 | 4/2014 | Roggenkamp |
| 2014/0100430 A1 | 4/2014 | Beane et al. |
| 2014/0101851 A1 | 4/2014 | Schuerch, Jr. |
| 2014/0107425 A1 | 4/2014 | Bonadio et al. |
| 2014/0107426 A1 | 4/2014 | Wilson |
| 2014/0110545 A1 | 4/2014 | Goett |
| 2014/0114134 A1 | 4/2014 | Theofilos et al. |
| 2014/0114135 A1 | 4/2014 | Ellman |
| 2014/0114136 A1 | 4/2014 | Ellman |
| 2014/0114137 A1 | 4/2014 | Reglos et al. |
| 2014/0114138 A1 | 4/2014 | Fedorov et al. |
| 2014/0114139 A1 | 4/2014 | Ziolo et al. |
| 2014/0115789 A1 | 5/2014 | Ramdath |
| 2014/0116452 A1 | 5/2014 | Ingimundarson et al. |
| 2014/0117197 A1 | 5/2014 | Stover et al. |
| 2014/0121467 A1 | 5/2014 | Vayser et al. |
| 2014/0123984 A1 | 5/2014 | Johnson et al. |
| 2014/0128682 A1 | 5/2014 | Loebl et al. |
| 2014/0128683 A1 | 5/2014 | Puskas et al. |
| 2014/0128684 A1 | 5/2014 | Carlson |
| 2014/0130260 A1 | 5/2014 | Kreuzer et al. |
| 2014/0135586 A1 | 5/2014 | Brustad et al. |
| 2014/0137874 A1 | 5/2014 | O'Reagan |
| 2014/0138503 A1 | 5/2014 | Consaul |
| 2014/0138505 A1 | 5/2014 | Maclaren-Taylor |
| 2014/0142393 A1 | 5/2014 | Piskun et al. |
| 2014/0144450 A1 | 5/2014 | Aarestad et al. |
| 2014/0144451 A1 | 5/2014 | Thanas |
| 2014/0148649 A1 | 5/2014 | Miles et al. |
| 2014/0148654 A1 | 5/2014 | Abrahams |
| 2014/0150803 A1 | 6/2014 | Gold |
| 2014/0158139 A1 | 6/2014 | Sayegh |
| 2014/0158140 A1 | 6/2014 | Sklar |
| 2014/0163318 A1 | 6/2014 | Swanstrom |
| 2014/0163327 A1 | 6/2014 | Swanstrom |
| 2014/0165291 A1 | 6/2014 | McCarty et al. |

(56) References Cited

U.S. PATENT DOCUMENTS

| | | |
|---|---|---|
| 2014/0166022 A1 | 6/2014 | Brown |
| 2014/0171748 A1 | 6/2014 | Bookwalter et al. |
| 2014/0173827 A1 | 6/2014 | Hiebert |
| 2014/0174451 A1 | 6/2014 | Hiebert |
| 2014/0174452 A1 | 6/2014 | Reaves |
| 2014/0174453 A1 | 6/2014 | Panzica |
| 2014/0174454 A1 | 6/2014 | Naef |
| 2014/0179998 A1 | 6/2014 | Pacey et al. |
| 2014/0180013 A1 | 6/2014 | Hanlon et al. |
| 2014/0180016 A1 | 6/2014 | Miles et al. |
| 2014/0180017 A1 | 6/2014 | Mulac et al. |
| 2014/0180036 A1 | 6/2014 | Bukkapatnam et al. |
| 2014/0182049 A1 | 7/2014 | Prust et al. |
| 2014/0182603 A1 | 7/2014 | Coppens |
| 2014/0183313 A1 | 7/2014 | McClain et al. |
| 2014/0187869 A1 | 7/2014 | Fan |
| 2014/0190488 A1 | 7/2014 | Robran et al. |
| 2014/0191097 A1 | 7/2014 | Noah et al. |
| 2014/0194698 A1 | 7/2014 | Melsheimer et al. |
| 2014/0197289 A1 | 7/2014 | Chen |
| 2014/0197290 A1 | 7/2014 | Davis |
| 2014/0202468 A1 | 7/2014 | Parsi |
| 2014/0213853 A1 | 7/2014 | Strauss et al. |
| 2014/0215716 A1 | 8/2014 | Mohr et al. |
| 2014/0216468 A1 | 8/2014 | Goldshleger et al. |
| 2014/0221759 A1 | 8/2014 | Mackool et al. |
| 2014/0221761 A1 | 8/2014 | Im |
| 2014/0221762 A1 | 8/2014 | Rebuffat et al. |
| 2014/0221764 A1 | 8/2014 | Pittenger et al. |
| 2014/0228719 A1 | 8/2014 | Richards et al. |
| 2014/0230827 A1 | 8/2014 | Jobe et al. |
| 2014/0231605 A1 | 8/2014 | Sharpe et al. |
| 2014/0235949 A1 | 8/2014 | Smith |
| 2014/0235953 A1 | 8/2014 | Okoniewski |
| 2014/0237720 A1 | 8/2014 | Heimbrock et al. |
| 2014/0238408 A1 | 8/2014 | Shepherd |
| 2014/0238409 A1 | 8/2014 | O'Brien |
| 2014/0243599 A1 | 8/2014 | Farin et al. |
| 2014/0245536 A1 | 9/2014 | Ermalovich |
| 2014/0249375 A1 | 9/2014 | Rodrigues, Jr. |
| 2014/0249531 A1 | 9/2014 | Staunton |
| 2014/0251341 A1 | 9/2014 | Simonian |
| 2014/0252291 A1 | 9/2014 | Koering |
| 2014/0257035 A1 | 9/2014 | Blain |
| 2014/0257038 A1 | 9/2014 | Kleyman |
| 2014/0257040 A1 | 9/2014 | Albrecht et al. |
| 2014/0257041 A1 | 9/2014 | Lloyd |
| 2014/0259425 A1 | 9/2014 | Lovechio |
| 2014/0261447 A1 | 9/2014 | Giles |
| 2014/0261448 A1 | 9/2014 | Knight |
| 2014/0263904 A1 | 9/2014 | Kozyra |
| 2014/0268512 A1 | 9/2014 | Kho et al. |
| 2014/0275697 A1 | 9/2014 | Filiberti |
| 2014/0275751 A1 | 9/2014 | Heitel et al. |
| 2014/0275791 A1 | 9/2014 | Lambrecht et al. |
| 2014/0275799 A1 | 9/2014 | Schuele |
| 2014/0275801 A1 | 9/2014 | Menchaca et al. |
| 2014/0275802 A1 | 9/2014 | Gerdts et al. |
| 2014/0276022 A1 | 9/2014 | Oghalai et al. |
| 2014/0276068 A1 | 9/2014 | Szpak et al. |
| 2014/0283305 A1 | 9/2014 | Zysman |
| 2014/0283845 A1 | 9/2014 | Slusarz, Jr. |
| 2014/0283846 A1 | 9/2014 | Fallouh |
| 2014/0283849 A1 | 9/2014 | Pecina et al. |
| 2014/0284441 A1 | 9/2014 | Easterbrook |
| 2014/0288377 A1 | 9/2014 | Worrel |
| 2014/0288379 A1 | 9/2014 | Miles et al. |
| 2014/0290666 A1 | 10/2014 | Agee et al. |
| 2014/0290667 A1 | 10/2014 | Masui |
| 2014/0291461 A1 | 10/2014 | Womble |
| 2014/0296646 A1 | 10/2014 | Wingeier et al. |
| 2014/0296650 A1 | 10/2014 | Weisshaupt et al. |
| 2014/0296747 A1 | 10/2014 | Herrnsdorf |
| 2014/0303447 A1 | 10/2014 | Singh et al. |
| 2014/0303477 A1 | 10/2014 | Sunazuka et al. |
| 2014/0304914 A1 | 10/2014 | Schnake et al. |
| 2014/0304919 A1 | 10/2014 | Hochman et al. |
| 2014/0305441 A1 | 10/2014 | Porter |
| 2014/0305442 A1 | 10/2014 | Bergenudd et al. |
| 2014/0305444 A1 | 10/2014 | Kring |
| 2014/0309499 A1 | 10/2014 | Swift |
| 2014/0311498 A1 | 10/2014 | Noras |
| 2014/0316209 A1 | 10/2014 | Overes et al. |
| 2014/0316213 A1 | 10/2014 | Thomas |
| 2014/0318550 A1 | 10/2014 | Doci et al. |
| 2014/0326251 A1 | 11/2014 | Trentacosta |
| 2014/0326841 A1 | 11/2014 | Goodheart |
| 2014/0330083 A1 | 11/2014 | O'Neil et al. |
| 2014/0330084 A1 | 11/2014 | Koteles, Jr. et al. |
| 2014/0330085 A1 | 11/2014 | Hawkins et al. |
| 2014/0330086 A1 | 11/2014 | Mire et al. |
| 2014/0330182 A1 | 11/2014 | Kilbey |
| 2014/0336468 A1 | 11/2014 | Pfabe et al. |
| 2014/0336471 A1 | 11/2014 | Pfabe et al. |
| 2014/0345059 A1 | 11/2014 | Mellberg et al. |
| 2014/0345625 A1 | 11/2014 | Abdoli-Eramaki |
| 2014/0350347 A1 | 11/2014 | Karpowicz et al. |
| 2014/0352070 A1 | 12/2014 | McGann |
| 2014/0352699 A1 | 12/2014 | Born |
| 2014/0357946 A1 | 12/2014 | Golden et al. |
| 2014/0361133 A1 | 12/2014 | Abu-Ulba |
| 2014/0364696 A1 | 12/2014 | Blurton et al. |
| 2014/0364697 A1 | 12/2014 | Son |
| 2014/0364698 A1 | 12/2014 | Nadershahi et al. |
| 2014/0366357 A1 | 12/2014 | Haarburger |
| 2014/0366888 A1 | 12/2014 | Phlegar |
| 2014/0366889 A1 | 12/2014 | Riley |
| 2014/0371539 A1 | 12/2014 | Ahluwalia |
| 2014/0371540 A1 | 12/2014 | Hutton et al. |
| 2014/0371541 A1 | 12/2014 | Friedrich et al. |
| 2014/0375456 A1 | 12/2014 | Sonnendorfer et al. |
| 2014/0378771 A1 | 12/2014 | St. Onge et al. |
| 2014/0378774 A1 | 12/2014 | Wooster |
| 2014/0378775 A1 | 12/2014 | Bowman et al. |
| 2015/0000043 A1 | 1/2015 | Scarleski |
| 2015/0000679 A1 | 1/2015 | Cuypers et al. |
| 2015/0005584 A1 | 1/2015 | Wilkins et al. |
| 2015/0005614 A1 | 1/2015 | Heggeness et al. |
| 2015/0007828 A1 | 1/2015 | Hiebert |
| 2015/0007829 A1 | 1/2015 | Davis |
| 2015/0252972 A1* | 9/2015 | Jiang .................. F21K 9/00 362/237 |
| 2016/0296401 A1† | 10/2016 | Cole |

FOREIGN PATENT DOCUMENTS

| | | |
|---|---|---|
| WO | 1995010389 A1 | 4/1995 |
| WO | 2015018922 A1 | 2/2015 |

OTHER PUBLICATIONS

Australian Search Report for Application No. 2015229719 dated Oct. 13, 2016.

International Search Report and Written Opinion for Application No. PCT/US2015/019436 dated May 20, 2015.

\* cited by examiner
† cited by third party

ROTATABLE SEAT CLAMPS FOR RAIL CLAMP

CROSS-REFERENCE TO RELATED APPLICATION

This application claims the benefit of the filing date of U.S. Provisional Patent Application No. 62/137,618 filed Mar. 24, 2015, the disclosure of which is hereby incorporated herein by reference.

BACKGROUND

This disclosure relates generally to a clamp assembly for use with a positioning system used to position body parts, such as a knee, during a medical or surgical procedure. The term knee, as used herein, is intended to be synonymous with a knee joint. More particularly, the system is used to first position the bones of the knee in a desired position and orientation. The position of the knee can be adjustably set along a plurality of different axes. Once the position of the knee is set, the system holds the knee in that position and orientation to facilitate the performance of a procedure on the patient. Although the particular embodiments described herein are described in relation to positioning a patient's knee, it should be understood that one of ordinary skill in the art could modify the concepts herein for positioning other parts of the body.

When a medical or surgical procedure is performed on a limb, such as an arm or leg, it may be desirable to restrict movement of the limb. Without holding the limb steady, it can become extremely difficult for the practitioner to perform procedures on the limb with precision. Further, with an increasing frequency, surgical procedures are performed with the aid of surgical navigation systems. This type of system often includes one or more trackers and a camera, for example.

In one version of such a system, at least one tracker is attached to the patient. Based on the signals emitted by the tracker, the camera and associated software determines the position of the tracker. By extension, this leads to the determination of the position of the attached patient. (Some surgical navigation systems have trackers with units that, instead of emitting energy, track energy emitted from the static source.) For many surgical navigation systems to operate, the trackers and camera must be in close proximity to each other. This means that it may be necessary to restrain the movement of the limb so that the tracker and complementary camera are able to engage in the appropriate signal exchange. Such surgical navigation systems are described more fully in U.S. Pat. No. 7,725,162, titled "Surgery system," the entire contents of which are hereby incorporated by reference herein.

Presently there are a number of different devices that can be used to hold the limb of the patient. These devices include some sort of shell or frame designed to receive the limb. Structural members hold the shell or frame to the operating table. At the start of the procedure, the patient's limb is placed in the shell. The shell is positioned at a location which preferably provides the practitioner with sufficient access to perform the procedure. If a navigation unit is used to facilitate the procedure, the shell is further positioned to ensure that any components of the system fitted to the patient are within the appropriate range to the complementary static components of the system. One particular limb positioning system is described in U.S. Patent Publication No. 2013/0019883, the disclosure of which is hereby incorporated by reference herein.

Some available limb holders are able to hold the limb of the patient in a fixed position, while other limb holders allow for movement of a portion of the limb. In either instance, a portion of the limb holder is typically attached to the operating table. A rail is commonly mounted on the table to promote this attachment.

It is common practice to place a sterile drape on the operating table prior to placing the patient on the table. This drape functions as a sterile barrier. If a portion of the limb holder is attached to the table, then it can be difficult, if not impossible to, place the drape around and/or under the attached portion of limb holder so as to provide the desired sterile barrier. Therefore, the drape is often place between the table and the attached portion of the limb holder. For example, the drape may be placed between the interior surface of a clamp assembly and a rail that is mounted on the table and engageable with the clamp assembly. Preserving this sterile barrier is important for patient safety, however, many known limb holders have a clamp assembly that may be likely to rip or tear the sterile drape, causing a loss of the desired sterile barrier.

BRIEF SUMMARY OF THE INVENTION

A first aspect of the present invention is a clamp assembly that is attachable to a support, such as a rail or bed rail. The clamp may comprise a body, first and second arms coupled to the body, and at least one seat clamp member pivotably coupled to at least one of the first and second arms. Preferable, the first and second arms are moveable towards and away from one another. In accordance with this first aspect, the clamp may be attached to the support when the at least one seat clamp member contacts the support and the first and second arms are moved into a clamped position.

A bias member may be coupled between the at least one seat clamp member and the at least one of the first and second arms. In use, the bias member urge the at least one seat clamp member away from the first and second arms into an open position. The bias member may be flat spring. Alternatively, the bias member may be a double torsion spring.

The at least one seat clamp member may include at least one leg adapted to contact the support. The at least one seat clamp member may alternatively have a pair of first and second legs, each leg being adapted to contact the support. In this regard, the first leg may be secured against a first flat surface of the support and the second leg may be secured against a second flat surface of the support. Both of the first and second flat surfaces may be transverse to define an edge of the support that is captured between the first and second legs of the seat clamp member. Either or both of the first and second legs may have a rounded contact surface. Likewise, either or both of the first and second legs may define a channel for receipt of the edge of the support.

A second aspect of the present invention is another clamp assembly that is attachable to the support. This clamp assembly desirably has a pair of first and second arms coupled to the body, each of the first and second arms being moveable towards and away from one another. A first seat clamp member may be pivotably coupled to the first arm, while a second seat clamp member may be pivotably coupled to the second arm.

Preferably, the first and second seat clamp members of this second aspect are biased away from the first and second seat clamp members using a set of first and second bias members. For example, a first bias member may be coupled between the first seat clamp member and the first arm, while a second bias member is coupled between the second seat clamp member and the second arm. According to this second aspect, the clamp assembly may be attached to the support when the first and second seat clamp members contact the support and the first and second arms are moved into a clamped position.

A third aspect of the present invention includes methods of attaching a clamp assembly, such as, for example, those described above with reference to the first and second aspects. A clamp used within these methods preferably has a pair of first and second seat clamp members that are coupled to corresponding pair of first and second arms. An exemplary support preferably has a rectangular portion with at least an upper corner defined by an upper surface and a side surface and a lower corner defined by the side surface and a lower surface. These methods desirably comprise the steps of moving the first and second arms toward one another, contacting the upper and side surfaces of the support with the upper seat clamp member, and contacting the lower and side surfaces of the support with the lower seat clamp member.

The particular steps of each method in accordance with this third aspect may vary according to the particular structure of each clamp assembly described herein. For example, these exemplary method steps may be varied to partially or fully secure the clamp to the support, or to secure a pylon with a pylon clamp that is operatively associated with the clamp assembly.

DETAILED DESCRIPTION

Figure 1:
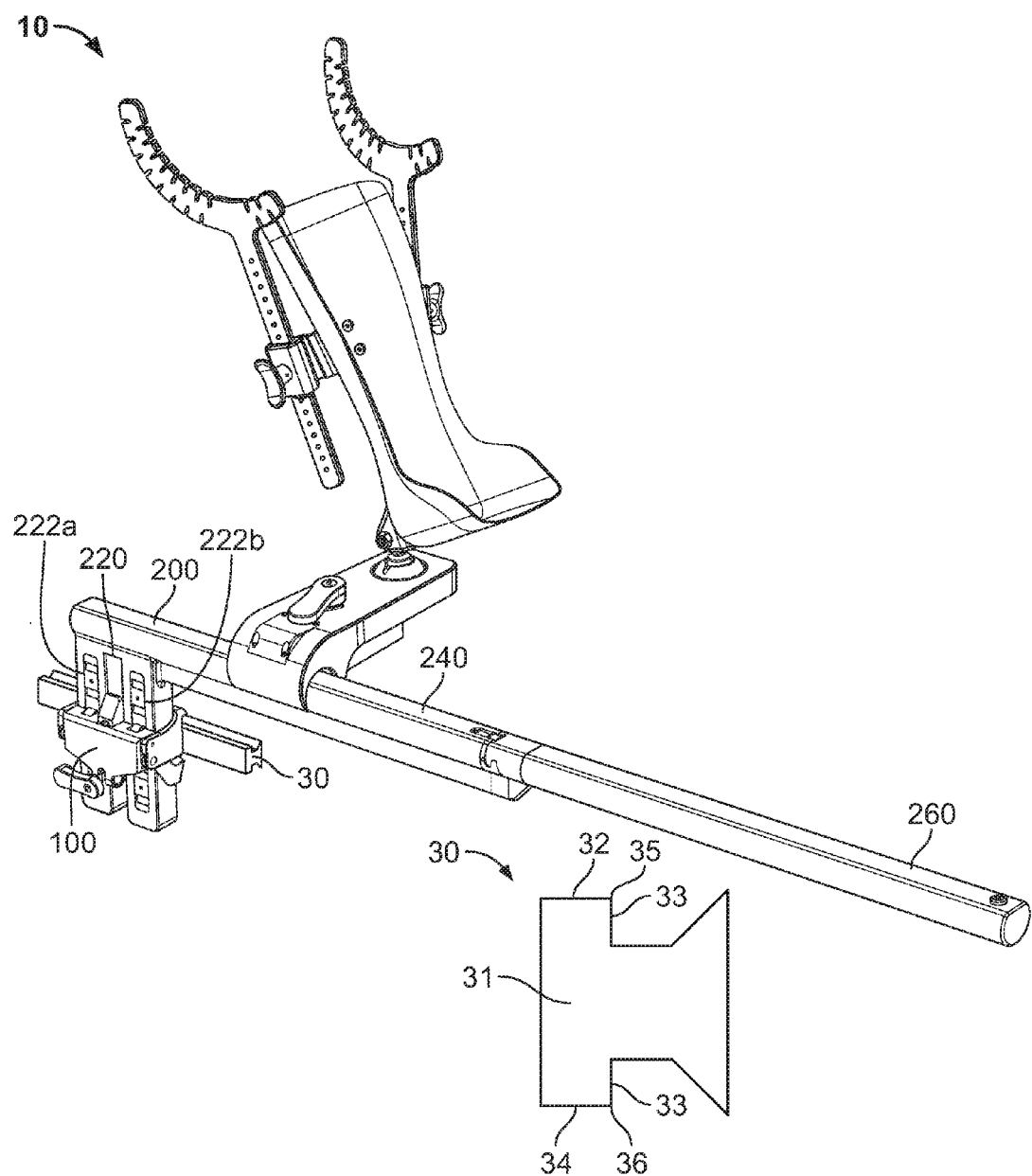
FIG. 1 is a perspective view of an exemplary limb positioning system attached to an embodiment of a rail, the limb positioning system including an embodiment of a clamp assembly.

FIG. 1 illustrates an exemplary embodiment of a limb positioning system 10. System 10 generally includes a clamp assembly 100 and a pylon and bar assembly 200. Numerous embodiments of clamp assembly 100 are described in this application along with numerous methods for using the same.

The particular system 10 shown in FIG. 1 is adapted to hold the foot and lower leg in any one of a number of positions and orientations relative to an operating table (not illustrated), which holds the remainder of the patient. Other embodiments of system 10 may be shaped to hold other body parts, such as an arm. The term table should be understood to include a table, a bed, or any support structure upon which a patient may be disposed.

Generally, system 10 is mounted to a rail 30 having a portion 31 with a generally rectangular cross-section as shown in FIG. 1. For example, in most instances, rectangular portion 31 is defined by an upper surface 32, side surface 33, and lower surface 34, each surface being transversely oriented so as to further define an upper edge or corner 35 and a lower edge or corner 36. Rail 30 is most often a bed rail that is firmly attached to the side of a surgical table. Clamp assembly 100 is used to mount system 10 to an embodiment of rail 30. Rail 30 may be a DIN rail, based on specifications published by Deutsches Institut für Normung, for example. It should be understood that clamp assembly 100 may be attached to other types of rails, and to a variety of sizes of bed rails. For example, Europe, Denmark, Japan, Switzerland, the United Kingdom, and the United States may each have bed rails with different standard shapes or sizes. Because of the novel features described herein, clamp assembly 10 is capable of use with rails having various shapes and sizes.

Figure 2:
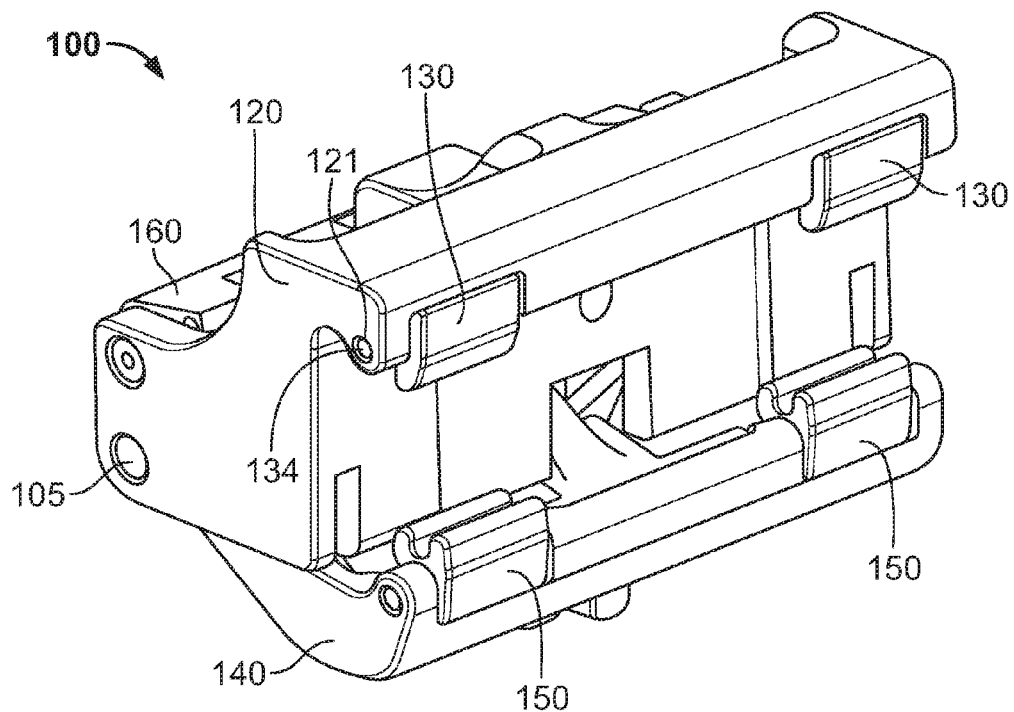
FIG. 2 is a front perspective view of the clamp assembly of FIG. 1.
Figure 3:
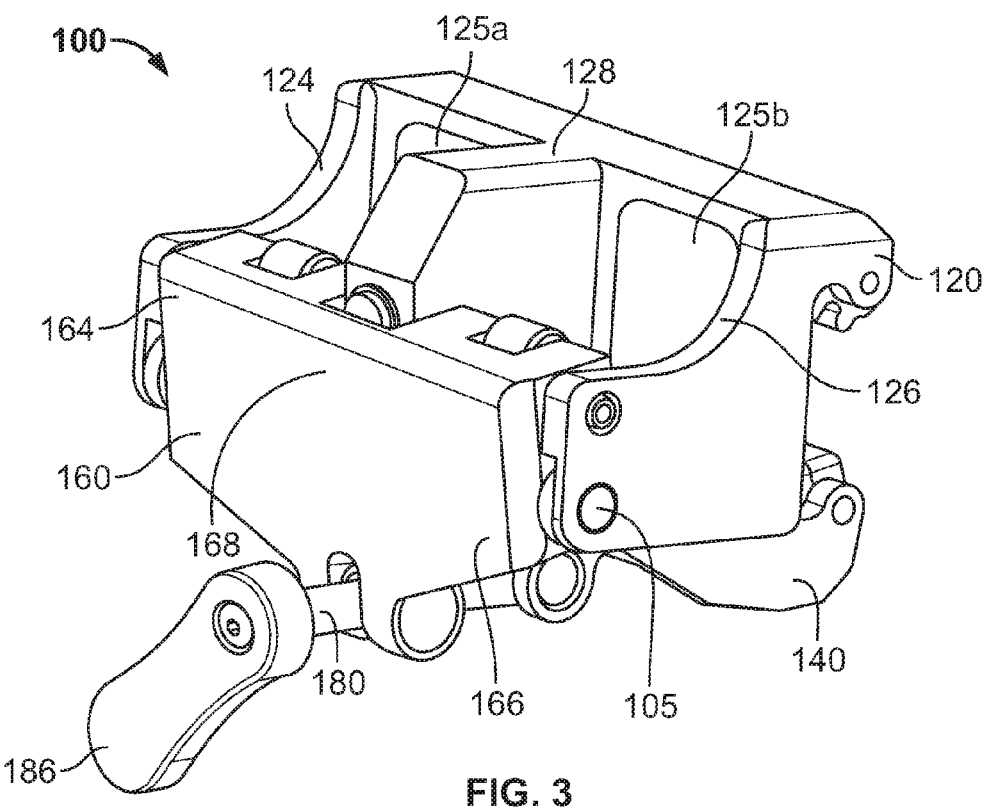
FIG. 3 is a back perspective view of the clamp assembly of FIG. 1.
Figure 4:
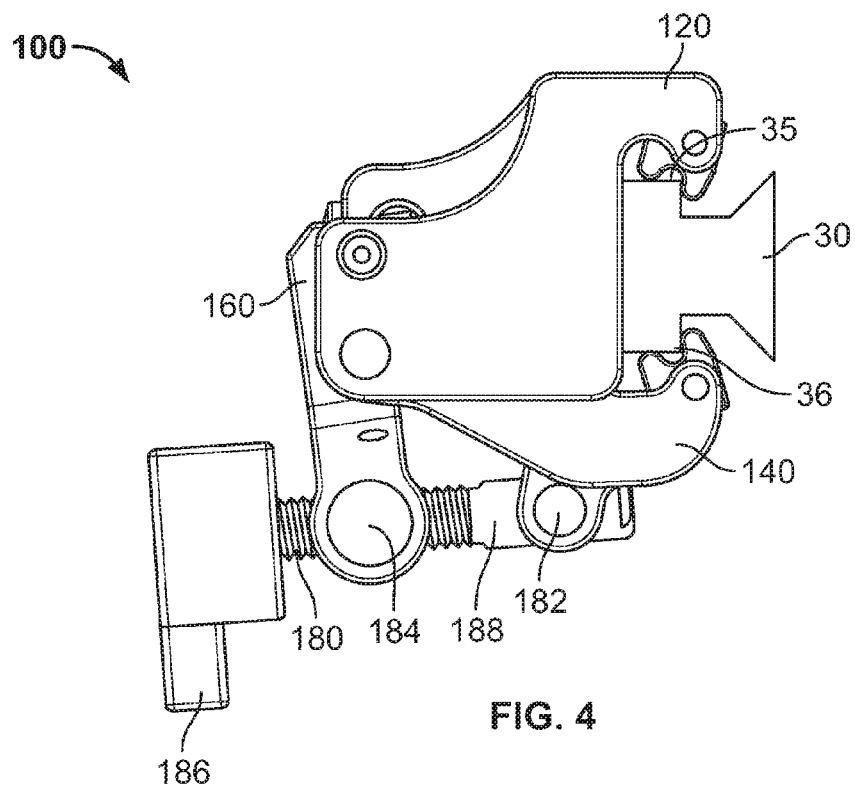
FIG. 4 is a side view of the clamp assembly of FIG. 1.
Figure 5:
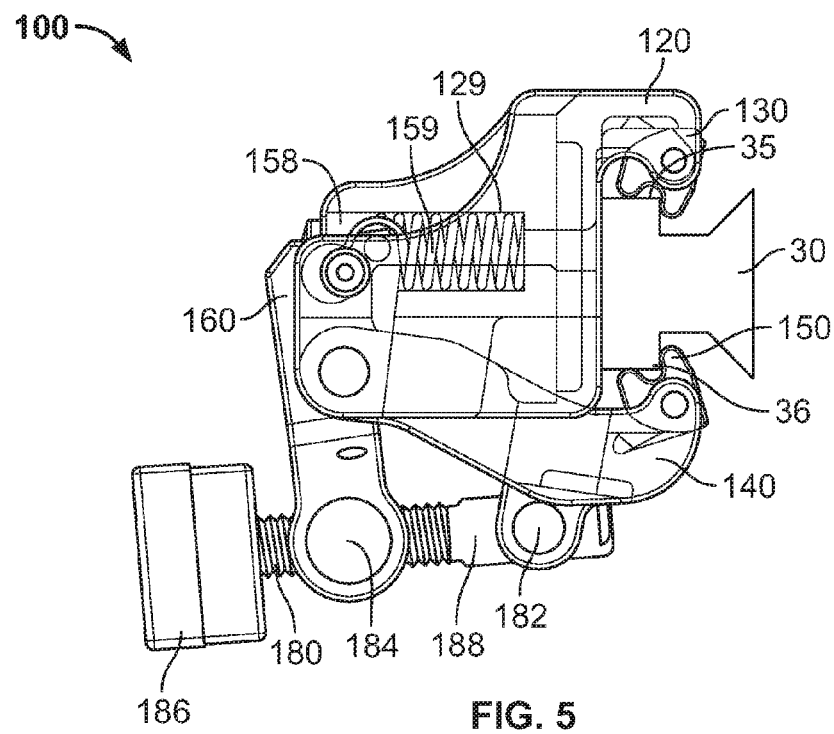
FIG. 5 is a partially transparent side view of the clamp assembly of FIG. 1.

As seen in FIGS. 2-5, clamp assembly 100 generally includes a first or upper jaw arm 120, a second or lower jaw arm 140, a pylon clamp or body 160, and a clamp knob 180. In use, upper arm 120 is positioned adjacent upper corner 35 of rail 30, while lower arm 140 is positioned adjacent lower corner 36 of rail 30, as illustrated in FIGS. 4-5.

Upper jaw arm 120 of FIG. 2 is illustrated as having a generally "J"-shaped profile having an elongated portion and a bent portion. Two seat clamp members or spring jaws 130, which may be referred to as jaw members or seat clamps 130, are depicted as being pivotably mounted to the bent portion of upper arm 120. For example, each spring jaw 130 may be mounted on a pivot or dowel pin 137 that extends through an aperture 121 in upper arm 120. Each pin 137 may be inserted into each aperture 121 through an aperture in jaw 130. Preferably, an end of pin 137 is threaded so as to be engaged with a set of corresponding threads within an interior portion of arm 120 as shown in FIG. 10, for example.

Figure 6A:
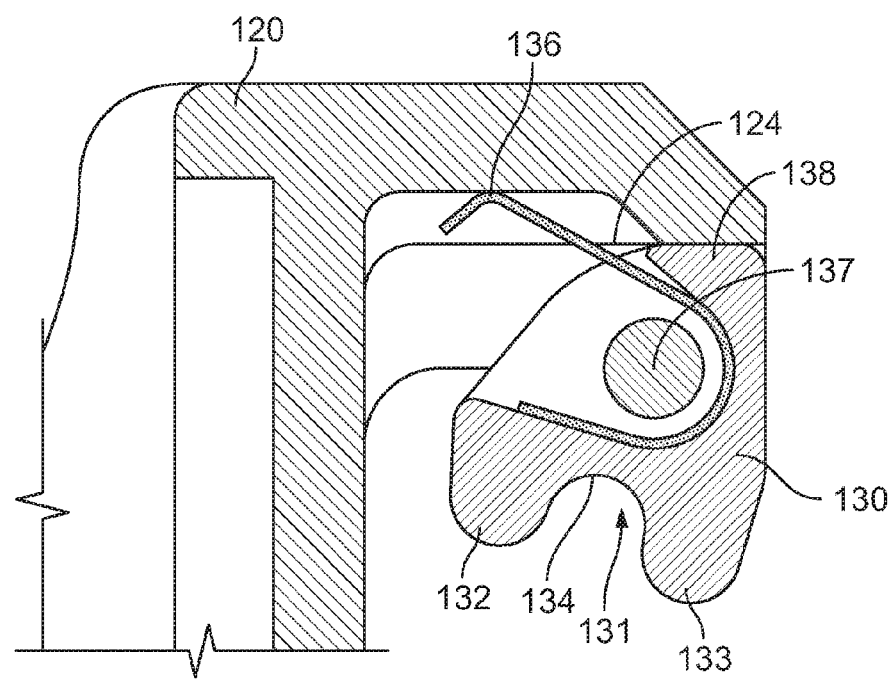
FIGS. 6A-B are enlarged cut-away side views of a portion of the clamp assembly of FIG. 1.
Figure 6B:
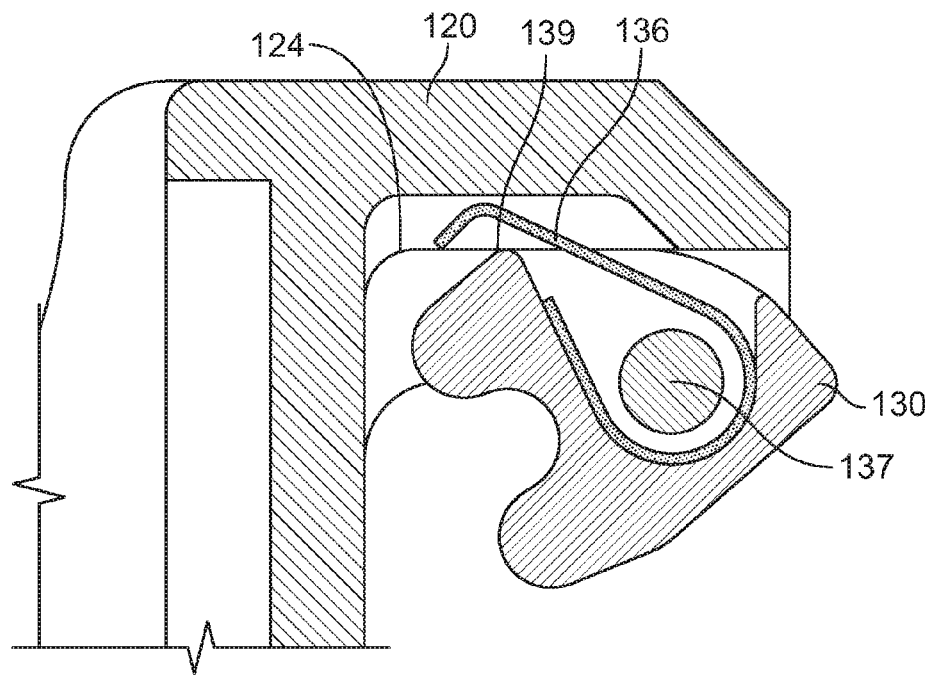

As best shown in FIGS. 6A-B, each jaw 130 preferably has a generally "U"-shaped profile with an interior channel or space 131 defined by a first leg 132, a second leg 133, and an interior curve 134 disposed between first and second legs 132 and 133. Interior curve 134 is positioned over upper corner 35 when clamp 100 is secured to bar 30. For example, each of legs 132 and 133 is depicted as having a rounded surface that is adapted for engagement with either of upper surface 32 or side surface 33 when interior curve 134 is positioned over upper corner 35. Preferably, the diameter of interior curve 134 is sized so that upper corner 35 is received within the interior space 131 without contacting interior curve 134. As noted above, a drape (not shown) may be placed around bar 30 before clamp assembly 100 is attached thereto. Utilizing legs 131 and 132 to engage the respective upper and side surfaces 32, 33 of bar 30 aids in preventing damage to the drape by creating points of contact of the legs on flat surfaces rather than at an edge such as upper corner 35, for example. As a result, upper corner 35 is prevented from cutting or otherwise damaging the drape.

Each spring jaw 130 is depicted in FIGS. 6A-B as being pivotable between a first or open position and a second or clamped position. Each jaw 130 is preferably biased towards the open position. In FIGS. 6A-B, for example, each jaw 130 is illustrated as being pivotable about dowel rod 137 and operatively attached to a bias member or bias member 136. FIG. 6A depicts bias member 136 in a preloaded position, wherein a first bump stop 138 of spring jaw 130 is adjacent a stop surface 124 of upper arm 120. For comparison, FIG. 6B depicts bias member 136 in a compressed, fully closed position, wherein a second bump stop 139 of jaw 130 is adjacent stop surface 124. Thus, together, FIGS. 6A and 6B depict a preferred range of motion for spring jaw 130. This range of motion desirably allows each spring jaw 130 to conform to a variety of rail sizes, as noted above; likewise, it also allows jaw 130 to guide clamp assembly 100 towards rail 30, as described with respect to the method steps set forth below.

Figure 10:
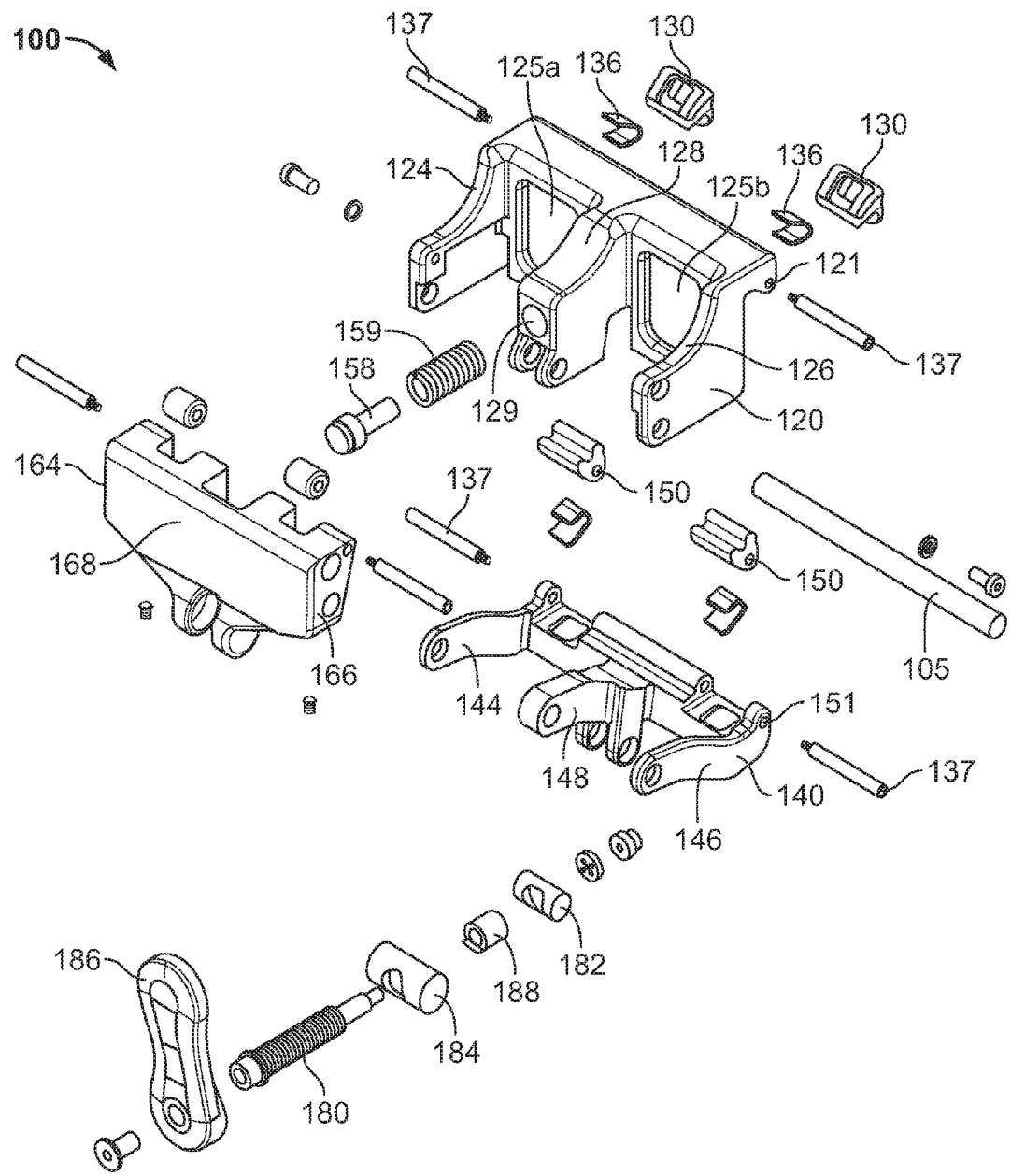
FIG. 10 provides an exploded view of the various components of an embodiment of a clamp assembly.

Upper arm 120 may include a first sidewall 124, a second sidewall 126, and a center wall 128 between first and second sidewall 124, 126 as shown in FIG. 3 and exploded view FIG. 10 of clamp assembly 100. A top portion of upper arm 120 may include one or more apertures, each capable of receiving a portion of system 10, such as a pylon 220. In the embodiment illustrated in FIG. 3, for example, upper arm 120 includes two apertures 125a and 125b. Aperture 125a is at least partially defined by sidewall 124 and center wall 128. Aperture 125b is at least partially defined by sidewall 126 and center wall 128. Although two apertures are illustrated, one aperture or more than two apertures may be used in alternate embodiments of upper arm 120.

Lower arm 140 of FIG. 2, like upper arm 120, is also illustrated as having a generally "J"-shaped profile with two spring jaws, clamp seats, or jaw members 150. Each spring jaw 150 is configured similarly to each spring jaw 130 described above. For example, as before, each spring jaw 150 is pivotably mounted on lower arm 140 via another dowel pin 137 as shown in FIG. 10 that preferably extends through an aperture 151 in arm 140 to be secured in like manner. Each jaw 150 also has an interior space 151 defined by a first leg 152, a second leg 153, and an interior curve 154 disposed between the first and second legs 152 and 153 (similar to that shown in FIG. 6A). The exterior surface of legs 152 and 153, as well as the diameter of curve 153, are all configured as above so that interior curve 154 is positioned over lower corner 36 when clamp 100 is secured to bar 30. Preferably, the diameter of interior curve 154 is also sized so that lower corner 36 is received within the interior space 151 without contacting interior curve 154. This desirably prevents lower corner 36 from damaging the drape, even if it also has a machined edge.

Lower arm 140 of preferably fits within upper arm 120. As shown in FIG. 10, for example, lower jaw arm 140 includes a first sidewall 144, a second sidewall 146, and a center wall 148. Each of the first and second sidewalls 144, 146, as well as center wall 148, may be at least partially positioned within corresponding recesses in upper arm 120. In particular, first sidewall 144 may be positioned within a recess defined at least in part by first sidewall 124 of upper arm 120, whereas second sidewall 146 may be positioned within a recess defined at least in part by second sidewall 126 of arm 120. Similarly, center wall 128 may be positioned within a recess defined at least in part by center wall 148.

Figure 7A:
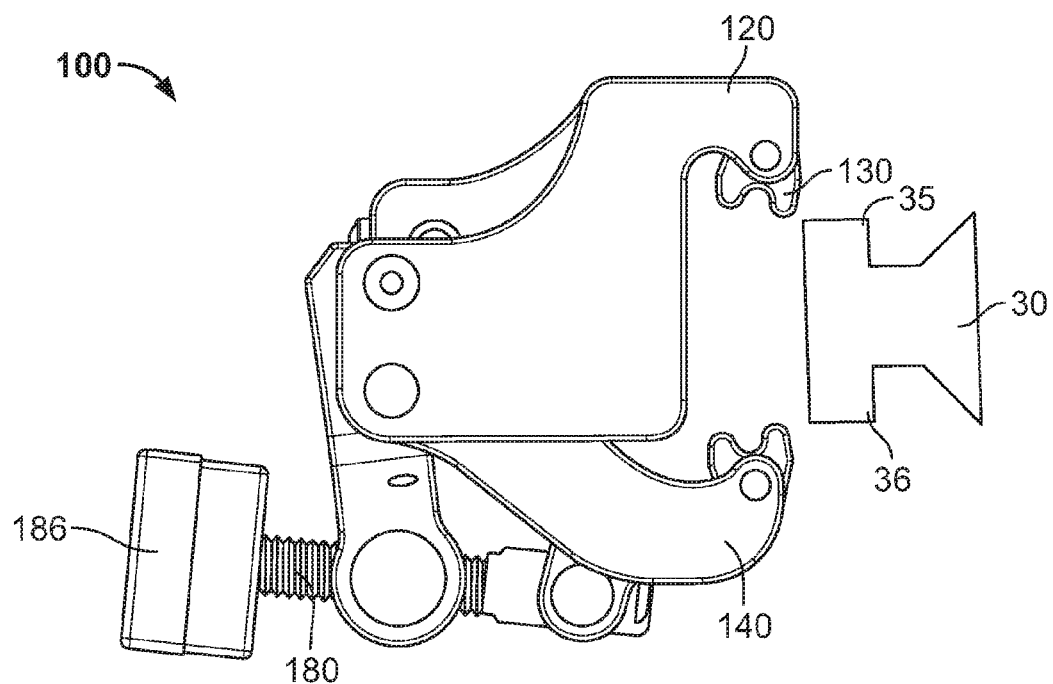
FIGS. 7A-E present a series of side views of the clamp assembly of FIG. 1, each side view depicting a position of the clamp assembly with respect to a rail.
Figure 7B:
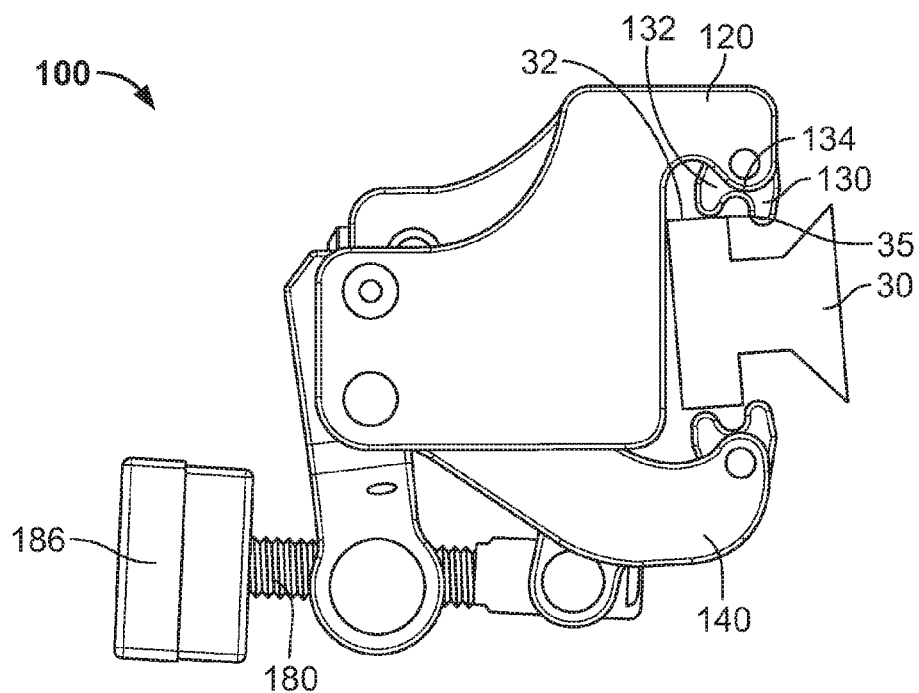
Figure 7C:
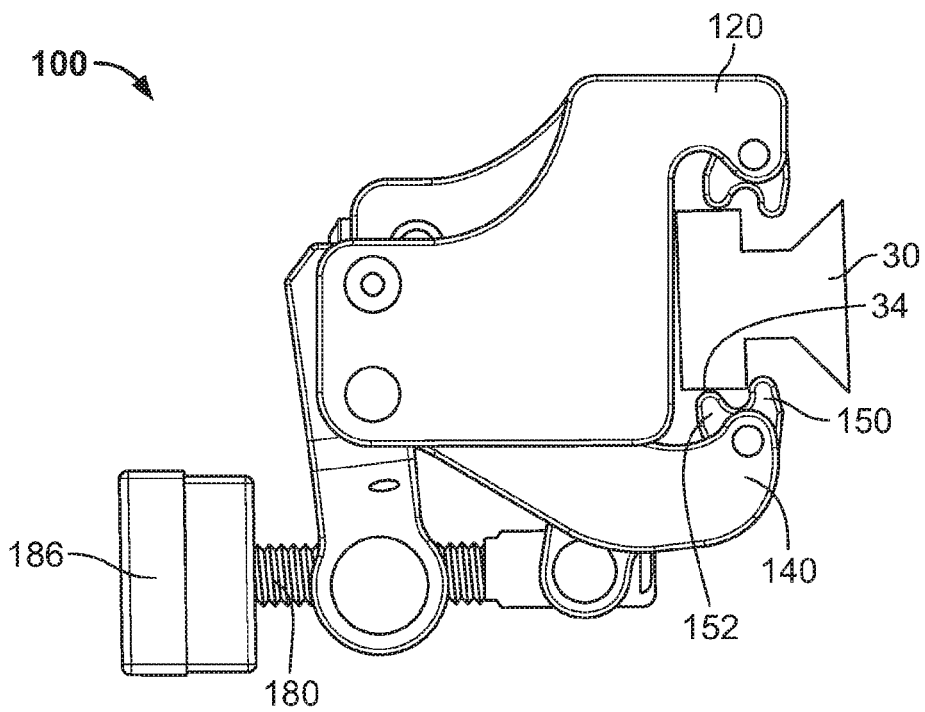
Figure 7D:
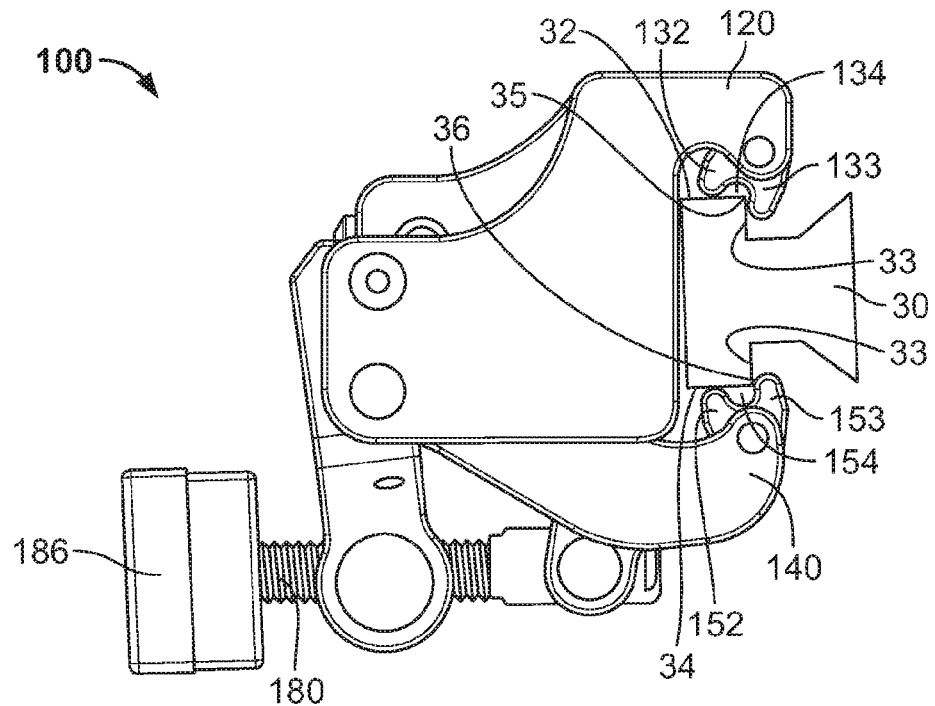
Figure 7E:
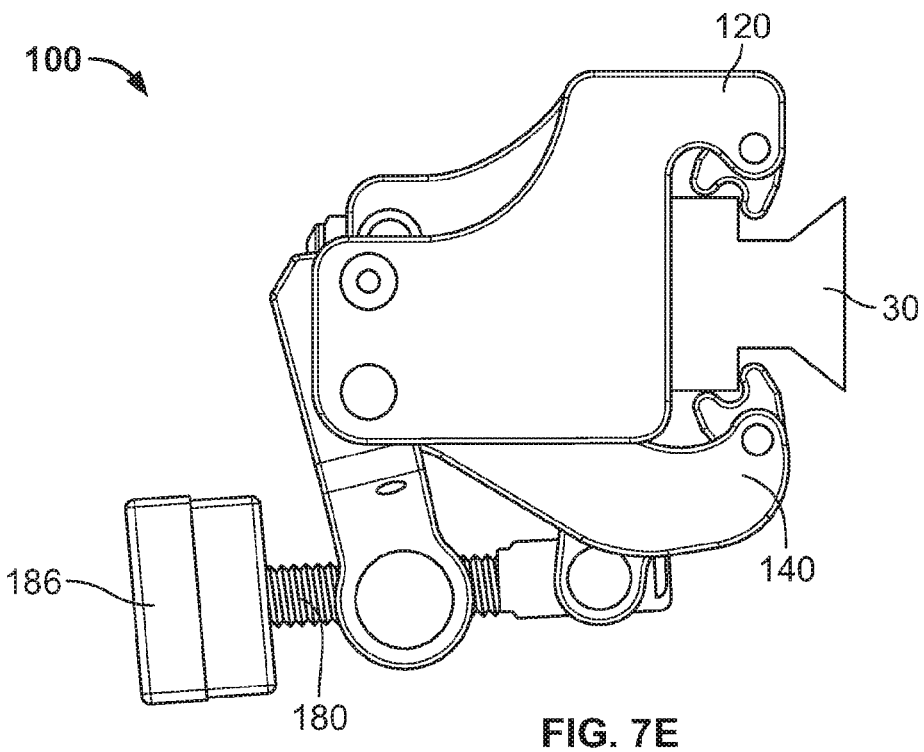

Lower jaw arm 140 is moveable relative to upper jaw arm 120 into either an open position as shown in FIG. 7A or a closed position as shown in FIG. 7E. This allows the distance between arms 120 and 140 to be varied, as needed, to secure a particular bar 30. In one embodiment, upper arm 120 is hingedly or pivotably connected to lower arm 140. For example, sidewall 124 of upper arm 120 and sidewall 144 of lower arm 140 are depicted in FIGS. 2-3 and 10 as having corresponding apertures, each aperture being adapted to accept a pin 105 or other structure about which lower arm 140 may rotate with respect to upper arm 120. Sidewall 126 of upper arm 120 and sidewall 146 of lower arm 140 may also have corresponding apertures configured to accept the other end of pin 105 or other structure about which lower arm 140 may rotate with respect to upper arm 120. Pin 105 may be a single elongated element that extends across upper arm 120 and lower arm 140, as shown in FIG. 10; alternatively, multiple smaller pins may be used. In FIGS. 5 and 10, a bottom portion of center wall 148 of lower arm 140 is depicted as having a pair of extension flanges having corresponding apertures to accept a pin 182 or other structure for coupling to a portion of a clamp knob 180 to lower arm 140, as noted below.

Clamp assembly 100 of FIG. 2 includes a pylon clamp 160 that is engageable with an element of system 10, such as pylon 220 of FIG. 1. In one embodiment, clamp knob 180 is used to both secure bar 30 between upper and lower jaw arms 120 and 140 and secure pylon 220 within pylon clamp 160. As shown in FIGS. 3 and 10, pylon clamp 160 has a first end 164 and a second end 166 with a center portion 168 positioned between first and second ends 164 and 166. Pylon clamp 160 may include a recess near the top of center portion 168 into which a portion of center wall 128 of upper arm 120 is configured to fit. Additional recesses may be formed on either side of the center recess in pylon clamp 160 to facilitate coupling of the pylon 220 with clamp assembly 100. As shown in FIG. 10, for example, second end 166 of pylon clamp 160 includes an aperture into which pin 105 extends, such that pylon clamp 160 may rotate with respect to upper arm 120 and lower arm 140 about pin 105. A similar aperture may be included in first end 164 of pylon clamp 160 for the same purpose. In FIGS. 3-5 and 10, for example, the bottom end of center portion 168 of pylon clamp 160 includes a pair of extension flanges having corresponding apertures to accept a pin 184 or other structure for coupling to a portion of clamp knob 180.

As shown in FIGS. 5 and 10, center wall 128 of upper arm 120 may include a recess 129 housing a spring pin 158. Spring pin 158 may include a generally cylindrical portion around which a spring 159 may be positioned. For example, spring 159 may be a die spring or a disc spring, as those terms are commonly understood. In the exemplary embodiment of FIG. 5, a first end of spring 159 contacts one end of the recess 129, while a second end of spring 151 contacts an enlarged portion of spring pin 158. The enlarged portion of spring pin 158, in turn, contacts center portion 168 of pylon clamp 160. Spring 159 biases pylon clamp 160 in the open position with respect to upper arm 120, thereby maximizing the clearance space in apertures 125a and 125b for insertion of pylon 200, as described in greater detail below.

Still referring to FIGS. 5 and 10, clamp knob 180 may generally include a handle 186 and distal housing 188. Distal housing 188 may be fixedly positioned with pin 182, which itself is fixed to the extension flanges of center wall 148 of lower jaw 140. A proximal portion of clamp knob 180 may be fixedly positioned with pin 184, which itself is fixed to the extension flanges of center portion 168 of pylon clamp 160. An inner surface of distal housing 188 may be threaded while an outer surface of a distal portion of clamp knob 180 may include complementary threads, for example. In this configuration, upon rotation of handle 186, the distal portion of clamp knob 180 will thread into or out of housing 188. Because housing 188 is fixed to lower jaw 140 and a proximal portion of clamp knob 180 is fixed to pylon clamp 160, as clamp knob 180 threads into or out of housing 188, the extension flanges of lower jaw 140 move toward or away from the extension flanges of pylon clamp 160, ultimately causing lower jaw 140 to pivot with respect to pylon clamp 160.

Numerous methods of connecting clamp assembly 100 to rail 30 are also contemplated as being part of the present invention. Each of these methods is enabled by the descriptions of each element of assembly 100 set forth herein. An exemplary method of connecting clamp assembly 100 to rail 30 is depicted in FIGS. 7A-E and described below.

To connect clamp assembly 100 to rail 30, lower arm 140 may need to be moved with respect to upper arm 120. If there is not enough clearance space for rail 30, for example, then clamp knob 180 is rotated in a first direction to move lower arm 140 away from upper arm 120 so that clamp 100 is in the open position shown in FIG. 7A. Interior curve 134 of spring jaw 130 may then be positioned over upper corner 35 of rail 30 so that an exterior surface of jaw 130 contacts upper surface 32 of rail 30. In FIG. 7B, for example, the rounded exterior surface of first leg 132 contacts upper surface 32 when interior curve 134 is positioned over upper corner 135. Clamp knob 180 is then rotated a number of turns in a second direction opposite of the first direction to move lower arm 140 toward upper arm 120 until an exterior surface of spring jaw 150 contacts lower surface 34 of rail 30. In FIG. 7C, for example, a rounded surface of first leg 152 contacts lower surface 34. Interior curve 154 may be positioned over lower corner 35 when first leg 152 contacts lower surface 34. Alternatively, as described below, curve 154 may obtain a position over lower corner 35 as clamp 100 is drawn towards bar 30 by moving lower arm 140 towards upper arm 120.

At this point, bar 30 is loosely secured between upper and lower arms 120 and 140 by portions of the respective upper and lower spring jaws 130 and 150. To secure clamp 100 to bar 30, clamp knob 180 is rotated another number of turns in the second direction to move lower arm 140 toward upper arm 120 until the respective exterior surfaces of spring jaws 130 and 150 contact surfaces of bar 30 that define upper and lower corners 35 and 36. Clamp 100 may be drawn towards bar 30 as lower arm 140 is moved toward upper arm 120 in this manner. For example, clamp 100 is shown as being partially secured to bar 30 in FIG. 7D, wherein lower jaw 140 has been moved towards upper jaw 120 until first leg 132 contacts upper surface 32 of bar 30 and second leg 133 contacts side surface 33 of bar 30. In this partially secured position, spring jaw 130 is rotated towards clamp knob 180 so as to capture upper corner 35 within interior space 134. This allows spring jaw 130 to impart a reaction force onto bar 30 that draw lower corner 36. For example, this reaction force may draw lower corner 36 into the fully secured position shown in FIG. 7E, wherein first leg 152 contacts lower surface 34 of bar 30 and second leg 153 contacts side surface 33 of bar 30 such that lower corner 36 is captured within interior space 154.

A number of desirable advantageous may be realized by this method. For example, clamp 100 is partially secured to bar 30 in FIG. 7D so that pylon clamp 160 may be still utilized to secure pylon 220. As a result, clamp 100 to be installed in advance of the remaining elements of system 10. This advantage may be realized because pylon clamp is spring-loaded within clamp assembly 100 and, thus, essentially remains open as upper jaw 120 initially closes with respect to lower arm 140. The degree to which spring pin 150 keeps pylon clamp 160 open is limited by the interaction of spring pin 158 with a recess in pylon clamp 160 shown in FIGS. 5 and 10. The initial closing of lower arm 140 with respect to upper arm 120 does not significantly compress spring 159. Instead, spring 159 is not significantly compressed (and pylon clamp 160 closed with respect to upper arm 120), until after upper arm 120 and lower arm 140 are fully secured to the rail 30 as shown in FIG. 7E. This is because as pylon clamp 160 continues to close, upper arm 120 is pressed against rail 30 and can no longer rotate in sync with pylon clamp 160. Accordingly, pylon clamp 160 is kept open when the upper arm 120 and lower arm 140 are partially secured to the rail 30 as shown in FIG. 7D so that pylon 220 may be easily be inserted through apertures 125a and 125b of upper arm 120.

A further benefit of this method is a reduced risk of disrupting the sterile field afforded by the drape. During a typical surgical procedure, a patient positioned on a surgical table will often have a drape or other sterile barrier covering the patient's body. The drape is typically placed over rail 30 and, thus, disposed between rail 30 and clamp 100. The rectangular edges of upper and lower corners 35 and 36 of bar 30 have the potential to cut, rip, or otherwise tear the drape, disrupting the sterile field. This risk is reduced by using clamp assembly 100 to loosely pin the drape to the table when partially secured position of FIG. 7D, thus providing the drape with at least some degree of movement until it is firmly secured to the table. Although not shown, it should be appreciated that portions of clamp assembly 100 may also include a buffing material to further reduce the risk of tearing the drape. The buffing material may be composed of any material that can be attached to any surface of upper or lower arms 120 and 140, as well as any surface of spring jaws 130 or 150. Preferably, the buffing material takes the form of an insert that may be discarded without the need for re-sterilization. Preferably still, the padding 40 is a strong, inexpensive material, such as a tarp material or a para-aramid synthetic fiber, such as that sold under the trade name Kevlar. Other materials that may be suitable include, for example, Parylene, polyurethanes, vinyl acetates, alkyds, polyesters, polyamides, or polyimides formed into thin sheets.

Pylon and bar assembly 200 may be coupled to clamp assembly 100 as illustrated in FIG. 1. Numerous additional elements of positioning system 10 may be attached to assembly 200. For example, pylon and bar assembly may include a pylon 220, base bar 240, and extension bar 260. It is contemplated that clamp assembly 100 may be further configured to support these additional attachments.

For example, as shown in FIG. 1, pylon 220 may comprise a first pylon bar 222a and a second pylon bar 222b. Each pylon bar 222a, 222b is generally rectangular and extends at a substantially perpendicular angle from an end portion of base bar 240. Pylon bar 222b extends from base bar 240 at a spaced distance from pylon bar 222a, but in all other respects is substantially identical to pylon bar 222a. Pylon bars 222a and 222b serve to mount base bar 240 to the operating table via clamp assembly 100 in order to support the elements of system 10 and a patient's limb held therein. Because base bar 240 (and extension bar 260, if being used) extends a distance substantially orthogonally to pylon bars 222a and 222b, the weight of system 10 and any limb held therein may apply a relatively large amount of torque on pylon 220 within clamp assembly 100. By using a relatively wide pylon 200, for example, by having two pylon bars 222a and 222b positioned at a spaced distance, the applied torque becomes less of a potential issue than if pylon 200 consisted of a single relatively thin structure. Although two pylon bars 222a, 222b are illustrated, other alternates may be possible, such as a relatively wide single pylon bar, or more than two pylon bars. It should be noted that clamp assembly 100 may need to have an alternate configuration for coupling to other types of pylons.

Figure 11:
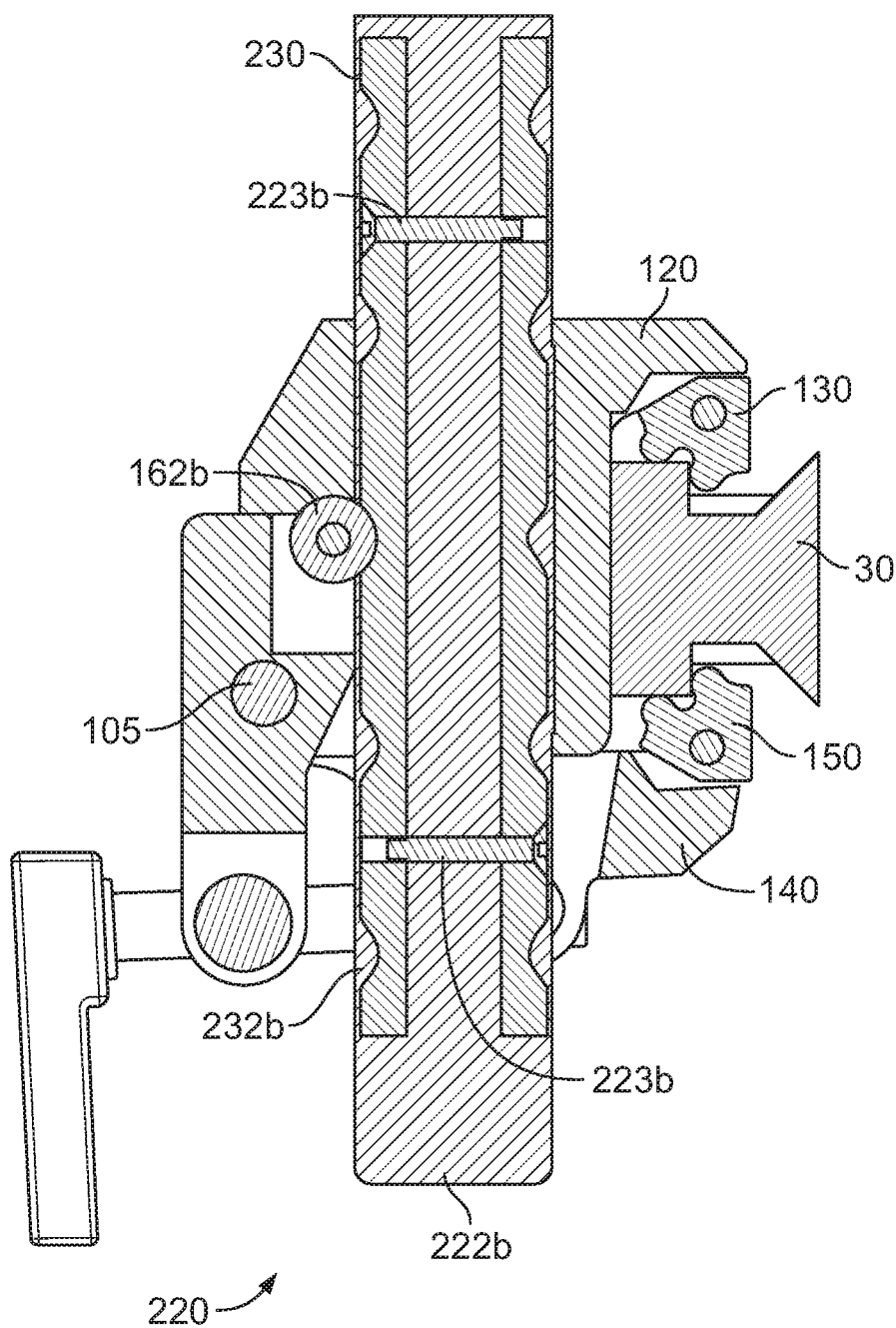
FIG. 11 provides a side view of a portion of an exemplary pylon secured in a clamp assembly.

Pylon bar 222a may further include a plate insert 230 with a plurality of notches 232a, as shown in FIG. 11. Elements of clamp assembly 100 may be configured to accommodate plate insert 230. In one embodiment, plate insert 230 may be a separate piece of material welded or otherwise attached to pylon bar 222a; alternatively, the notches 232a may be integral with pylon bar 222a. Each notch 232a may be curved, substantially forming a portion of a circle. The notches 232a may be equally spaced along pylon bar 222a, although varying spacing may be used if desired. Another set of notches 232a may be positioned on the opposite surface of pylon bar 222a. Pylon bar 222b may contain a similar set of notches 232b. Preferably, the spacing of notches 232a with respect to pylon bar 222a is substantially identical to the spacing of notches 232b with respect to pylon bar 222b. If plate inserts are used on each side of pylon bar 222a or 222b, they may be connected to one another, for example by connecting screw 223b illustrated in FIG. 11.

As noted above in connection to FIGS. 7A-E, prior to coupling pylon and bar assembly 200 to clamp assembly 100, upper arm 120 and lower arm 140 are partially secured to rail 30 with pylon clamp 160 in a relatively open position with respect to upper arm 120 as shown in FIG. 7D. At this point, clamp assembly may be secured to rail 30 such that it will remain coupled to rail 30 without further action. With the pylon clamp 160 in a relatively open position with respect to upper arm 120, pylon 220 may be coupled to clamp assembly 100. To accomplish this, pylon bar 222a is simultaneously inserted into aperture 125a while pylon bar 222b is inserted into aperture 125b. Upper arm 120 and pylon clamp 160 are dimensioned such that as pylon bars 222a and 222b enter apertures 125a and 125b, wheels 162a and 162b of pylon clamp 160 contact pylon bars 222a and 222b, respectively, rotating as the pylon bars 222a and 222b move further into the apertures 125a and 125b. As wheels 162a and 162b rotate against the moving pylon bars 222a and 222b, they successively engage notches 232a and 232b. As wheels 162a and 162b enter a particular pair of notches 232a and 232b, tactile and/or auditory feedback will alert the user that the wheels 162a and 162b have "clicked" into a particular pair of notches 232a and 232b. Each pair of notches 232a and 232b provides a different height at which base bar 240 may be set with respect to rail 30. The wheels 162a and 162b may or may not be spring loaded against pylon 220.

Once the pylon bars 222a and 222b and wheels 162a and 162b are positioned within the desired pair of notches 232a and 232b with the base bar 240 at the desired height, the user may continue to rotate clamp knob 180. Further rotation of clamp knob 180 causes lower arm 140 to pivot further closed with respect to upper arm 120, fully locking clamp assembly 100 to rail 30. Once clamp assembly 100 is fully secured to rail 30 as show in FIG. 7E, the pivoting motion of pylon clamp 160 cannot be meaningfully transferred to upper arm 120. As a result, further rotation of clamp knob 180 causes pylon clamp 160 to pivot further toward upper arm 120 and further compress spring 159 against spring pin 158. As pylon clamp 160 further pivots, pylon clamp 160 and the wheels 162a and 162b further press into the respective pylon bars 222a and 222b, locking pylon 220 into clamp assembly 100 at the desired height.

Numerous alternate embodiments of various elements of clamp assembly 100 are also contemplated a being part of the present invention. Two specific examples are provided in FIG. 8 and FIGS. 9A-B. Wherever possible, these alternative embodiments have been described with like element numbers to those listed above, except with a prime designation.

Figure 8:
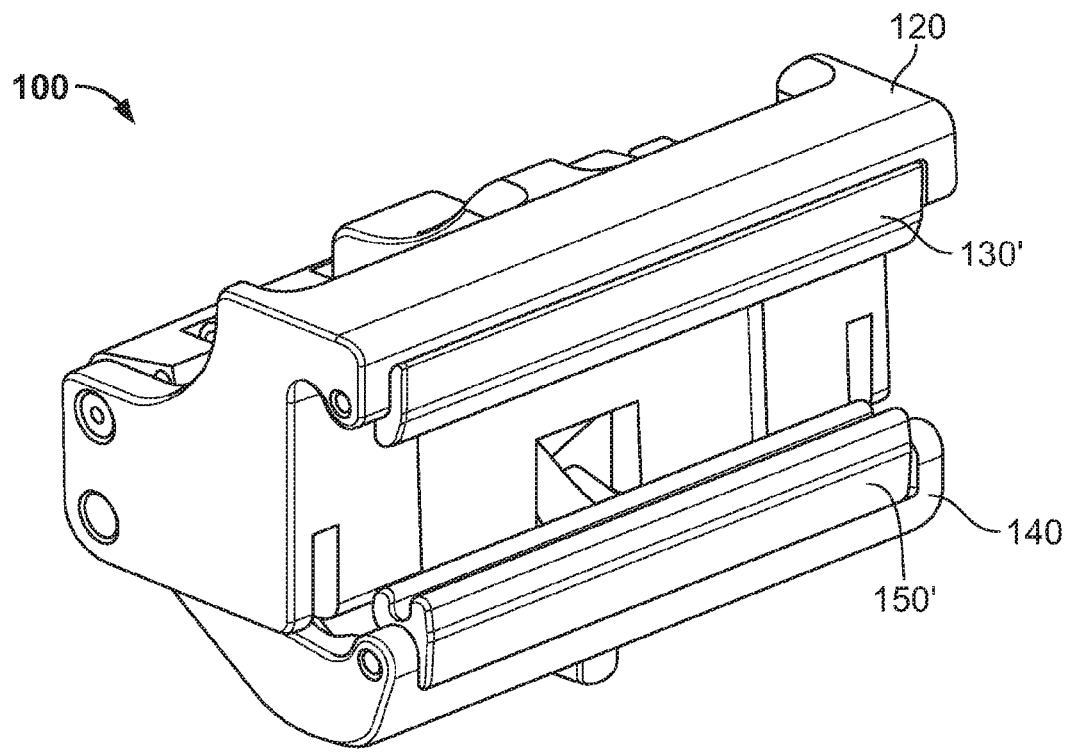
FIG. 8 is a front perspective view of an alternative embodiment of a clamp assembly.

Alternative embodiments of spring jaws 130 and 150 are depicted in FIG. 8. In FIG. 2, for example, two spring jaws 130 are depicted, wherein each jaw 130 extends along a minor portion of each of the upper and lower arms 120 and 140. For example, each jaw 130 or 150 may extend along about 10-20% of the length of the length of each arm 120 or 140. The embodiment of FIG. 8 depicts a single jaw 130' or 150' extending along a major portion of each of the upper and lower arms 120 and 140. For example, each jaw 130' or 150' may extend along about 70-90% of the length of the length of each arm 120 or 140. These ranges are not limiting, but merely provided to confirm that spring jaws 130 and 150 may be configured in any number or length without departing from the present invention. Moreover, it should be further appreciated that any embodiment of spring jaws may also be intermixed. For example, although not shown, an alternatively clamp assembly 100' may have an upper arm 120' with a spring jaw 130' and lower arm 140' with a plurality of spring jaw 150.

Figure 9A:
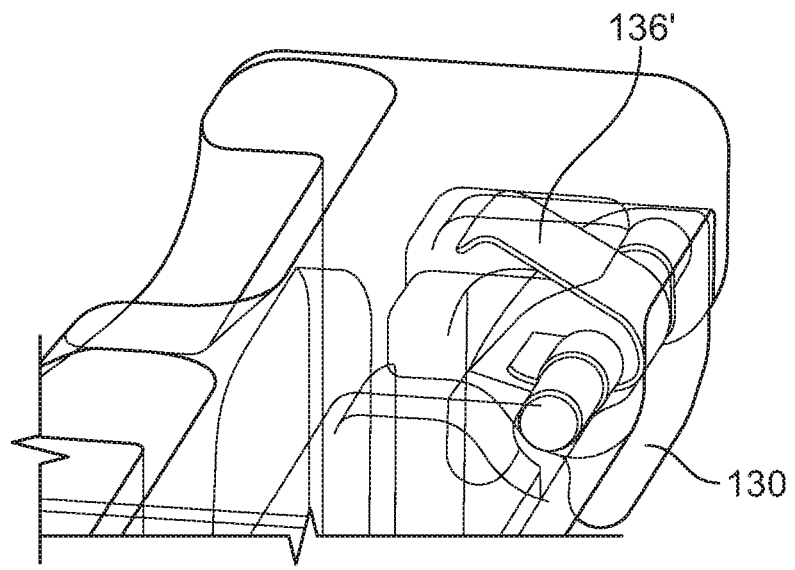
FIGS. 9A-B are partially transparent perspective views of alternative clamp assembly embodiments.
Figure 9B:
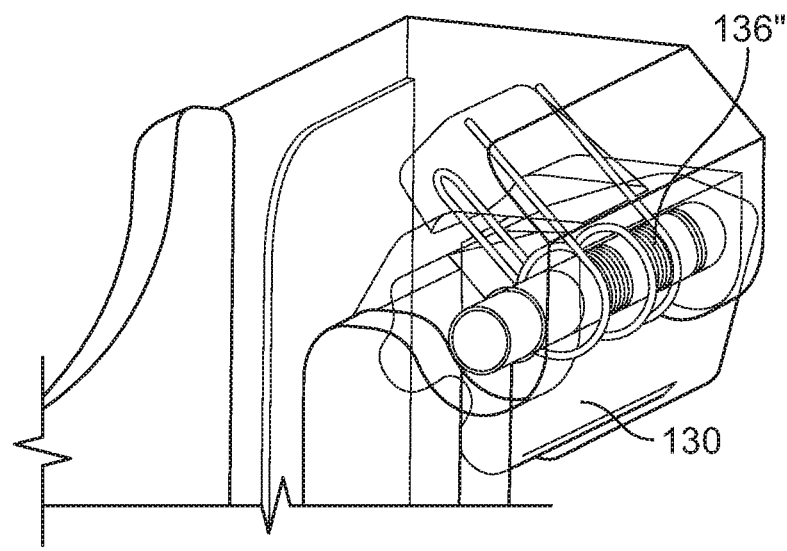

Alternative embodiments of bias member 136 are depicted in FIGS. 9A-B. A bias member 136' is depicted in FIG. 9A as flat spring that is otherwise engageable with each of spring jaws 130 or 150 in a like manner Desirably, the additional surface area provided by bias member 136', combined with its inherently larger cross-section, allows element 136' to exert a greater biasing force than the wire-like embodiment of spring 136. As a further modification, a spring 136" is depicted in FIG. 9B as a double torsion spring with both wire-like and flat portions. One portion of bias member 136" may be adapted to draw clamp 100 towards bar 30, whereas another portion is adapted to bias each spring jaw 130 or 150 towards the open position.

Based on at least the above descriptions, it should be apparent that clamp assembly 100 also allows a number of benefits to be realized by limb positioning system 10. For example, a user may easily attach clamping assembly 100 to a variety of shapes of rails connected to an operating table. The connection allows for quick insertion of pylon and bar assembly 200 into clamping assembly 100 so as to fix an element of a limb holder at a desired horizontal and vertical position with respect to rail 30. The stability afforded by clamping assembly 100 allows the lower leg (or other limb) to be firmly held in neutral, intermediate, and extreme positions. For example, during a knee surgery, the lower leg may be held at extreme internal or external rotation angles, which may be useful to open joint compartments at any desired level of flexion or extension. The stability of clamping assembly 100 also allows tracking devices to be attached to a portion of the limb holder. The trackers may provide the ability to determine a position of an element of the limb holder and/or the patient's limb held therein. Furthermore, trackers may be attached to a robot that controls the positioning of certain moveable elements of the limb holder, such that some or all of the positioning may be automated.

As described above, limb positioning system 10 may be used with different parts of the body. Clamp assembly 100 supports each of these uses. When used with a foot and lower leg, for example, an illustrative list of procedures which may be performed includes total knee arthroplasty, partial knee arthroplasty, patella-femoral resurfacing, anterior cruciate ligament ("ACL") reconstruction, high tibial osteotomy, tibial tubercle transfer, antegrade femoral nail, and focal plug defect management/osteochondral autograft transfer system ("OATS"). A variety of hip procedures, such as direct anterior hip replacement may also be performed using limb positioning system 10 with a foot and lower leg. It should be noted that minor mechanical modifications may be made to system 10 for use in other surgical procedures, each potential use being fully supported by clamp 100.

Although the invention herein has been described with reference to particular embodiments, it is to be understood that these embodiments are merely illustrative of the principles and applications of the present invention. It is therefore to be understood that numerous modifications may be made to these embodiments and that other arrangements may be devised without departing from the spirit and scope of the present invention as defined by the appended claims.

The invention claimed is:

1. A clamp attachable to a support, the clamp comprising:
a body;
first and second arms coupled to the body, the first and second arms moveable towards and away from one another; and
at least one seat clamp member pivotably coupled to at least one of the first and second arms,
wherein the clamp is attached to the support when the at least one seat clamp member contacts the support and the first and second arms are in a clamped position.

2. The clamp of claim 1, further comprising:
a bias member coupled between the at least one seat clamp member and at least one of the first and second arms.

3. The clamp of claim 2, wherein the bias member is a flat spring.

4. The clamp of claim 2, wherein the bias member is a double torsion spring.

5. The clamp of claim 1, wherein the at least one seat clamp member rotates from a first position clockwise to a second position as the clamp is attached to the support.

6. The clamp of claim 1, wherein the at least one seat clamp member includes first and second legs, and wherein at least one of the first and second legs contacts the support.

7. The clamp of claim 6, wherein the first leg contacts a first flat surface of the support and the second leg contacts a second flat surface of the support.

8. The clamp of claim 6, wherein the first and second legs each have a rounded contact surface.

9. The clamp of claim 6, wherein the first and second legs define a channel for receipt of an edge of the support.

10. The clamp of claim 1, wherein a first pivot pin couples the first and second arms to the body, and a second pivot pin couples the at least one seat clamp member to at least one of the first and second arms.

11. A clamp attachable to a support, the clamp comprising:
a body;
first and second arms coupled to the body, the first and second arms moveable towards and away from one another; and
a first seat clamp member pivotably coupled to the first arm and a second seat clamp member pivotably coupled to the second arm,
wherein the first and second seat clamp members are biased away from the first and second arms respectively.

12. The clamp of claim 11, further comprising:
a first bias member coupled between the first seat clamp member and the first arm and a second bias member coupled between the second seat clamp member and the second arm,
wherein the clamp is attached to the support when the first and second seat clamp members contact the support and the first and second arms are in a clamped position.

13. The clamp of claim 12, wherein each of the first and second bias members is a flat spring.

14. The clamp of claim 12, wherein each of the first and second bias members is a double torsion spring.

15. The clamp of claim 11, wherein each of the first and second seat clamp members include first and second legs, and wherein at least one of the first and second legs of each of the first and second seat clamp members contacts the support.

16. The clamp of claim 15, wherein the first leg of each of the first and second seat clamp members contacts a first flat surface of the support and the second leg of each of the first and second seat clamp members contacts a second flat surface of the support.

17. The clamp of claim 15, wherein each of the first and second legs of each of the first and second seat clamp members have a rounded contact surface.

18. The clamp of claim 15, wherein each of the first and second legs of each of the first and second seat clamp members define a channel for receipt of an edge of the support.

19. A method of attaching a clamp having first and second seat clamp members pivotably coupled to first and second arms to a support having an upper corner defined by an upper surface and a side surface and a lower corner defined by the side surface and a lower surface, the method comprising the steps of:
moving the first and second arms toward one another;
contacting the upper and side surfaces of the support with the first seat clamp member; and
contacting the lower and side surfaces of the support with the second seat clamp member.

20. The method of claim 19, wherein the first and second arms are coupled to a body, the first and second arms moveable towards and away from one another, and wherein the clamp is attached to the support when each of the first and second seat clamp members contact the support and the first and second arms are in a clamped position.

* * * * *